(12) United States Patent
Lee

(10) Patent No.: US 12,241,546 B1
(45) Date of Patent: Mar. 4, 2025

(54) VEHICLE POWERTRAIN SHIFT CONTROL METHOD

(71) Applicants: HYUNDAI MOTOR COMPANY, Seoul (KR); KIA CORPORATION, Seoul (KR)

(72) Inventor: Sang Chul Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/606,294

(22) Filed: Mar. 15, 2024

(30) Foreign Application Priority Data

Oct. 31, 2023 (KR) .................. 10-2023-0148285

(51) Int. Cl.
*F16H 61/06* (2006.01)
*F16H 61/02* (2006.01)
(Continued)

(52) U.S. Cl.
CPC . *F16H 61/0262* (2013.01); *B60W 2510/0657* (2013.01); *F16H 59/18* (2013.01);
(Continued)

(58) Field of Classification Search
CPC ......... F16H 61/0021; F16H 2061/0087; F16H 2061/0096; F16H 2061/009;
(Continued)

(56) References Cited

U.S. PATENT DOCUMENTS 8,306,713 B2 * 11/2012 Mayumi ................ F16H 61/08
 701/87
12,025,218 B1 * 7/2024 Lee ..................... F16H 61/0204
(Continued)

FOREIGN PATENT DOCUMENTS

KR  2023-0024493 A  2/2023

OTHER PUBLICATIONS

Combined DE102020212553A1 (Madler et al.) and English translation; Aug. 14, 2024 (Year: 2024).*
(Continued)

*Primary Examiner* — Roger L Pang
(74) *Attorney, Agent, or Firm* — MCDONNELL BOEHNEN HULBERT & BERGHOFF LLP

(57) ABSTRACT

A vehicle powertrain shift control method includes a step of determining which of four types of divided hydraulic pressure difference areas a main hydraulic pressure difference belongs, by a controller, the main hydraulic pressure difference being a value obtained by subtracting a coupling-side preparatory hydraulic pressure from a coupling-side preliminary target pressure, and a step of limiting the inclination of the control hydraulic pressure corrected calculated value of a first shift initiation phase or a second shift initiation phase so as not to deviate from predetermined limit values, by the controller, when corresponding to an area in which the main hydraulic pressure difference is equal to/less than a predetermined positive first reference value, and an area in which the main hydraulic pressure difference is equal to/larger than a predetermined negative second reference value, respectively, among the four types of hydraulic pressure difference areas.

17 Claims, 17 Drawing Sheets

(51) Int. Cl.
  *F16H 59/18* (2006.01)
  *F16H 61/00* (2006.01)
(52) U.S. Cl.
  CPC .. *F16H 61/0021* (2013.01); *F16H 2061/0087* (2013.01); *F16H 2061/009* (2013.01); *F16H 2061/0096* (2013.01); *F16H 2061/062* (2013.01)
(58) Field of Classification Search
  CPC ............... F16H 61/0262; F16H 61/06; F16H 2061/062; F16H 59/18
  USPC .......................... 701/51, 59; 477/117, 158
  See application file for complete search history.

(56) References Cited

U.S. PATENT DOCUMENTS

| | | | |
|---|---|---|---|
| 2003/0027684 A1* | 2/2003 | Watanabe | F16H 3/64 477/102 |
| 2015/0105988 A1* | 4/2015 | Inoue | F16H 61/061 701/59 |

OTHER PUBLICATIONS

Combined DE1022206716A1 (Emmerich et al.) and English translation; Aug. 14, 2024 (Year: 2024).*

* cited by examiner

FIG. 2

| shift stages | shift elements | | | | | |
|---|---|---|---|---|---|---|
| | UDC | ODC | 37RC | 46C | 28B | LRB |
| P | | | | | | ○ |
| R | | | ○ | | | ○ |
| N | | | | | | ○ |
| 1 | ○ | | | | | ○ |
| 2 | ○ | | | | ○ | |
| 3 | ○ | | ○ | | | |
| 4 | ○ | | | ○ | | |
| 5 | ○ | ○ | | | | |
| 6 | | ○ | | ○ | | |
| 7 | | ○ | ○ | | | |
| 8 | | ○ | | | ○ | |

| | ($T_T$) | ($T_{RD}$) | ($T_{DC}$) | ($T_{OD}$) | ($T_{UD}$) | ($T_{46}$) | ($T_{28}$) | ($T_{37}$) | ($T_{LRB}$) | ($T_E$) | ($T_{IS}$) | ($T_{MT}$) | ($T_{Imp}$) |
|---|---|---|---|---|---|---|---|---|---|---|---|---|---|
| $\omega_T$ | 0.304 | -0.034 | 0.304 | -0.236 | 0.000 | -0.304 | 0.000 | -0.163 | -0.068 | 0.000 | 0.000 | 0.000 | 0.000 |
| $\omega_{IS}$ | 0.000 | -0.034 | 0.304 | -0.236 | 0.000 | -0.304 | 0.000 | -0.163 | -0.068 | 0.000 | 0.000 | 0.000 | 0.000 |
| $\omega_{S1}$ | 0.000 | 0.000 | 0.000 | 0.000 | 0.000 | 0.000 | 0.000 | 0.000 | 0.000 | 0.000 | 0.000 | 0.000 | 0.000 |
| $\omega_{S2}$ | 0.163 | -0.018 | 0.163 | -0.127 | 0.000 | -0.163 | 0.000 | -0.087 | -0.036 | 0.000 | 0.000 | 0.000 | 0.000 |
| $\omega_{R1}$ | 0.105 | -0.012 | 0.105 | -0.081 | 0.000 | -0.105 | 0.000 | -0.056 | -0.023 | 0.000 | 0.000 | 0.000 | 0.000 |
| $\omega_{R2}$ | 0.000 | 0.000 | 0.000 | 0.000 | 0.000 | 0.000 | 0.000 | 0.000 | 0.000 | 0.000 | 0.000 | 0.000 | 0.000 |
| $\omega_{C2}$ | 0.068 | -0.008 | 0.068 | -0.053 | 0.000 | -0.068 | 0.000 | -0.036 | -0.015 | 0.000 | 0.000 | 0.000 | 0.000 |
| $\omega_C$ | 0.000 | 0.000 | 0.000 | 0.000 | 0.000 | 0.000 | 0.000 | 0.000 | 0.000 | 0.000 | 0.000 | 0.000 | 0.000 |
| $\omega_{TF}$ | -0.101 | 0.011 | -0.101 | 0.078 | 0.000 | 0.101 | 0.000 | 0.054 | 0.022 | 0.000 | 0.000 | 0.000 | 0.000 |
| $\omega_{OUT}$ | 0.034 | -0.004 | 0.034 | -0.027 | 0.000 | -0.034 | 0.000 | -0.018 | -0.008 | 0.000 | 0.000 | 0.000 | 0.000 |
| $\omega_E$ | 0.000 | 0.000 | -4.931 | 0.000 | 0.000 | 0.000 | 0.000 | 0.000 | 0.000 | 4.931 | 0.000 | 0.000 | -4.931 |
| $T_{UD}$ | 2.563 | 0.006 | 2.563 | -2.575 | 0.000 | -2.563 | 0.000 | -1.375 | 0.012 | 0.000 | 0.000 | 0.000 | 0.000 |
| $T_{28}$ | -1.017 | -0.002 | -1.017 | 1.374 | 0.000 | 2.017 | 0.000 | 1.546 | -0.357 | 0.000 | 0.000 | 0.000 | 0.000 |
| $T_{IS}$ | 0.985 | 0.002 | 0.985 | 0.012 | 0.000 | 0.015 | 0.000 | 0.008 | 0.003 | 0.000 | 0.000 | 0.000 | 0.000 |
| $T_{MT}$ | -1.863 | -0.004 | -1.863 | 2.224 | 0.000 | 2.863 | 0.000 | 1.536 | 0.639 | -1.000 | 0.000 | 0.000 | 0.000 |

FIG. 10

$J = $ [$\dot{\omega}_I$, $\dot{\omega}_{IS}$, $\dot{\omega}_{S1}$, $\dot{\omega}_{S2}$, $\dot{\omega}_{R1}$, $\dot{\omega}_{R2}$, $\dot{\omega}_{C2}$, $\dot{\omega}_C$, $T_{TF}$, $\dot{\omega}_{CUT}$, $\dot{\omega}_E$, $T_{JD}$, $T_{IS}$, $T_{MT}$]$^T$ $= H \cdot D$, where $D = [T_I, T_{RD}, T_{DC}, T_{CD}, T_{JD}, T_{46}, T_{28}, T_{37}, T_{LRB}, T_E, T_{IS}, T_{MT}, T_{Imp}]^T$

| | ($T_I$) | ($T_{RD}$) | ($T_{DC}$) | ($T_{CD}$) | ($T_{JD}$) | ($T_{46}$) | ($T_{28}$) | ($T_{37}$) | ($T_{LRB}$) | ($T_E$) | ($T_{IS}$) | ($T_{MT}$) | ($T_{Imp}$) |
|---|---|---|---|---|---|---|---|---|---|---|---|---|---|
| ($\dot{\omega}_I$) | 8.901 | -0.014 | 8.901 | -11.853 | 0.000 | -17.357 | 8.456 | -13.232 | 2.951 | 0.000 | 0.000 | 0.000 | 0.000 |
| ($\dot{\omega}_{IS}$) | 8.901 | -0.014 | 8.901 | -11.853 | 0.000 | -17.357 | 8.456 | -13.232 | 2.951 | 0.000 | 0.000 | 0.000 | 0.000 |
| ($\dot{\omega}_{S1}$) | -8.456 | -0.020 | -8.456 | 11.425 | 0.000 | 16.773 | -8.317 | 12.854 | -2.969 | 0.000 | 0.000 | 0.000 | 0.000 |
| ($\dot{\omega}_{S2}$) | 4.776 | -0.008 | 4.776 | -6.360 | 0.000 | -9.314 | 4.537 | -7.100 | 1.584 | 0.000 | 0.000 | 0.000 | 0.000 |
| ($\dot{\omega}_{R1}$) | 0.044 | -0.012 | 0.044 | 0.001 | 0.000 | 0.016 | -0.060 | 0.036 | -0.045 | 0.000 | 0.000 | 0.000 | 0.000 |
| ($\dot{\omega}_{R2}$) | -8.456 | -0.020 | -8.456 | 11.425 | 0.000 | 16.773 | -8.317 | 12.854 | -2.969 | 0.000 | 0.000 | 0.000 | 0.000 |
| ($\dot{\omega}_{C2}$) | -2.951 | -0.015 | -2.951 | 4.027 | 0.000 | 5.921 | -2.969 | 4.553 | -1.075 | 0.000 | 0.000 | 0.000 | 0.000 |
| ($\dot{\omega}_C$) | 0.000 | 0.000 | 0.000 | 0.000 | 0.000 | 0.000 | 0.000 | 0.000 | 0.000 | 0.000 | 0.000 | 0.000 | 0.000 |
| ($T_{TF}$) | -0.042 | 0.011 | -0.042 | -0.001 | 0.000 | -0.015 | 0.058 | -0.035 | 0.043 | 0.000 | 0.000 | 0.000 | 0.000 |
| ($\dot{\omega}_{CUT}$) | 0.014 | -0.004 | 0.014 | 0.000 | 0.000 | 0.005 | -0.020 | 0.012 | -0.015 | 0.000 | 0.000 | 0.000 | 0.000 |
| ($\dot{\omega}_E$) | 0.000 | 0.000 | 0.000 | 0.000 | 0.000 | 0.000 | 0.000 | 0.000 | 0.000 | 4.931 | 0.000 | 0.000 | -4.931 |
| ($T_{JD}$) | 0.998 | 0.002 | 0.998 | -0.460 | 0.000 | 0.542 | -1.539 | 1.004 | -0.538 | 0.000 | 0.000 | 0.000 | 0.000 |
| ($T_{IS}$) | 0.550 | 0.001 | 0.550 | 0.600 | 0.000 | 0.878 | -0.428 | 0.670 | -0.149 | 0.000 | 0.000 | 0.000 | 0.000 |
| ($T_{MT}$) | -0.359 | -0.001 | -0.359 | 0.192 | 0.000 | -0.120 | 1.479 | -0.750 | -1.167 | 0.000 | 0.000 | 0.000 | 0.000 |

VEHICLE POWERTRAIN SHIFT CONTROL METHOD

CROSS REFERENCE TO RELATED APPLICATIONS

This application is based on and claims priority under 35 U.S.C. 119 to Korean Patent Application No. 10-2023-0148285, filed on Oct. 31, 2023, in the Korean Intellectual Property Office, the disclosure of which is herein incorporated by reference in its entirety.

BACKGROUND

1. Field

The present disclosure relates to a technology for controlling a powertrain configured to transfer power generated by an engine mounted in a vehicle to a driving wheel.

2. Description of the Prior Art

A vehicle powertrain includes multiple components, such as a transmission, in order to transfer power generated by the engine to the driving wheel at an appropriate level of revolutions and torque.

A transmission control unit (TCU) is configured to control the transmission on the basis of various pieces of control data preconfigured with regard to the transmission, in order to conduct control appropriate for various traveling situations of the vehicle.

Conventionally, the control data is used in such a scheme that, while the transmission is repeatedly driven, a human manually maps the same.

Control data mapped manually as described above tends to be greatly affected by the experiences or skills of the human who maps the control data. Accordingly, the data has insufficient reliability, and a considerable period of time is necessary to construct the control data.

Therefore, if a powertrain model of the vehicle is generated such that the TCU controls the transmission on the basis of the powertrain model, rapid mapping of control data may then be possible, reliability of control data may be secured, and it may be possible to improve the vehicle's shift quality thereby.

The foregoing described as the background art is intended merely to aid in the understanding of the background of the present disclosure, and is not intended to mean that the present disclosure falls within the purview of the related art already known to those skilled in the art.

SUMMARY

An aspect of the present disclosure to provide a vehicle powertrain shift control method wherein, in connection with controlling a transmission on the basis of a powertrain model of a vehicle by a controller, shifting is not excessively delayed in a low-torque area in which the flow rate of oil for operating the transmission is insufficient, and shift control is conducted efficiently and stably, thereby improving the shift quality.

In accordance with an aspect of the present disclosure, a vehicle powertrain shift control method may include calculating, by a controller configured to divide a shift process into a series of shift phases and perform shift control on the basis of the shift phases, a control hydraulic pressure basic calculated value for implementing a necessary torque of a control target shift element according to the shift phases by using a control matrix generated from a vehicle powertrain model, calculating a control hydraulic pressure corrected calculated value by correcting the control hydraulic pressure basic calculated value with a correction value including a learning value regarding the shift element; and controlling the control target shift element according to the control hydraulic pressure corrected calculated value, wherein, after the calculating of the control hydraulic pressure corrected calculated value and before the controlling of the control target shift element. The vehicle powertrain shift control method may further include determining which of four types of divided hydraulic pressure difference areas a main hydraulic pressure difference belongs, by the controller, the main hydraulic pressure difference being a value obtained by subtracting a coupling-side preparatory hydraulic pressure from a coupling-side preliminary target pressure, and limiting the inclination of the control hydraulic pressure corrected calculated value of a first shift initiation phase or a second shift initiation phase so as not to deviate from predetermined limit values, by the controller, when corresponding to an area in which the main hydraulic pressure difference is equal to/less than a predetermined positive first reference value, and an area in which the main hydraulic pressure difference is equal to/larger than a predetermined negative second reference value, respectively, among the four types of hydraulic pressure difference areas.

The four types of hydraulic pressure difference areas may be divided into a first area in which the main hydraulic pressure difference is a positive number exceeding the first reference value, a second area in which the main hydraulic pressure difference is equal to/less than the first reference value and is equal to/larger than zero, a third area in which the main hydraulic pressure difference is a negative number equal to/larger than the second reference value, and a fourth area in which the main hydraulic pressure difference is less than the second reference value.

In the first shift initiation phase, the inclination of the control hydraulic pressure basic calculated value may be calculated by dividing the main hydraulic pressure difference by the time taken for the first shift initiation phase.

In a case in which the main hydraulic pressure difference belongs to the second area, the controller may control the inclination of the control hydraulic pressure corrected calculated value so as not to deviate below a second area-related limit value, which is one of the limit values, in the second shift initiation phase.

In a case in which the main hydraulic pressure difference belongs to the second area, the control target shift element may be controlled in the first shift initiation phase according to the control hydraulic pressure corrected calculated value calculated on the basis of the control hydraulic pressure basic calculated value calculated by dividing the main hydraulic pressure difference by the time taken for the first shift initiation phase.

In a case in which the main hydraulic pressure difference belongs to the third area, the controller may control the inclination of the control hydraulic pressure corrected calculated value so as not to deviate below a third area-related limit value, which is one of the limit values, in the second shift initiation phase.

In a case in which the main hydraulic pressure difference belongs to the third area, the controller may perform holding by limiting the inclination of the control hydraulic pressure corrected calculated value to zero, which is one of the limit values, and maintaining the zero value in the first shift initiation phase.

The holding may be released if a driver tip-in occurs while holding the inclination of the control hydraulic pressure corrected calculated value to zero in the first shift initiation phase.

If holding of the control hydraulic pressure corrected calculated value is released in the first shift initiation phase, the control hydraulic pressure corrected calculated value may be calculated by dividing the difference between the coupling-side preliminary target pressure and the current control hydraulic pressure of the control target shift element by the remaining time of the first shift initiation phase, the control target shift element is controlled according to the control hydraulic pressure corrected calculated value calculated on the basis of the control hydraulic pressure basic calculated value calculated as above.

The controller may perform dividing of the main hydraulic pressure difference into four types of hydraulic pressure difference areas in the final stage of a hydraulic pressure preparation phase or in the initial phase of the first shift initiation phase.

The control matrix may be calculated by using relation equations of angular velocity, angular acceleration, moment of inertia, and torque of powertrain components, and a boundary condition based on a transmission state, and the controller may perform calculating of the control hydraulic pressure basic calculated value by selecting a predetermined control matrix according to whether a shift is proceeding and the type of the shift.

The control matrix may be calculated by multiplying the inverse matrix of an angular acceleration dominant matrix including coefficients of angular acceleration terms of the relation equations by an external torque dominant matrix including coefficients of external torque terms of the relation equations, and the external torques may be torques which can be controlled by the controller, or which are input to the powertrain from the outside.

The control matrix may include in-gear state control matrices regarding an in-gear state in which the transmission is not conducting a shift; and a dynamic state control matrix regarding an ongoing shift state.

One in-gear state control matrix may be provided with regard to each shift stage which the transmission can implement, and one dynamic state control matrix may be provided with regard to each shift element which remains engaged during a shift.

The controller may select a control matrix regarding a shift element which remains engaged before/after a shift from the dynamic state control matrices if the transmission is shifting.

The angular acceleration dominant matrix may be configured by separating angular acceleration terms of the relation equations into a product of an angular acceleration coefficient matrix and an angular acceleration column vector, placing the product on one side of the equal sign, separating external torque terms of the relation equations into a product of an external torque coefficient matrix and an external torque column vector, and placing the product on the other side of the equal sign; multiplying columns of coefficients regarding external torque terms which may be regarded as being in a completely connected state, among the powertrain components, and thus may be considered as linear parameters changed by a torque input to the powertrain, among the external torque coefficient matrix, by $-1$, and connecting and placing the resulting rigid connection matrix to the right of the angular acceleration coefficient matrix; connecting and placing a boundary condition matrix including rows expressing a boundary condition according to the state of the transmission beneath the angular acceleration coefficient matrix; and placing a dummy matrix filled with zero is placed at the location of intersection between the rigid connection matrix and the boundary condition matrix of the angular acceleration coefficient matrix, thereby configuring a square matrix.

The external torque dominant matrix may include a dummy matrix obtained by filling columns used for the rigid connection matrix, among the external torque coefficient matrix, with zero, and filling rows corresponding to the boundary condition matrix of the angular acceleration coefficient matrix with zero.

The present disclosure is advantageous in that, in connection with controlling a transmission on the basis of a powertrain model of a vehicle by a controller, shifting is not excessively delayed in a low-torque area in which the flow rate of oil for operating the transmission is insufficient, and shift control is conducted efficiently and stably, thereby improving the shift quality.

BRIEF DESCRIPTION OF THE FIGURES

The above and other aspects, features, and advantages of the present disclosure will be more apparent from the following detailed description taken in conjunction with the accompanying drawings, in which:

FIG. 2 is a table enumerating transmission operating modes in relation to FIG. 1;

FIG. 4 is a matrix equation expressing the relation between angular velocity, angular acceleration, moment of inertia, and torque of components of the powertrain in FIG. 1 as a product of an angular acceleration coefficient matrix and an angular acceleration column vector and a product of an external torque coefficient matrix and an external torque column vector;

FIG. 5 illustrates a second-stage in-gear state of a transmission, which is expressed by an angular acceleration dominant matrix and an external torque dominant matrix, with state column vectors and external torque column vectors omitted therefrom;

FIG. 6 illustrates the relation between an angular acceleration dominant matrix and an external torque dominant matrix for obtaining a dynamic state control matrix corresponding to a state in which an underdrive clutch is engaged, with state column vectors and external torque column vectors omitted therefrom as in FIG. 5;

FIG. 9 illustrates a control matrix relation equation for which a second-stage in-gear state control matrix is used;

FIG. 10 illustrates a control matrix relation equation which uses a dynamic state control matrix regarding an underdrive clutch as a control matrix;

DETAILED DESCRIPTION

Figure 1:
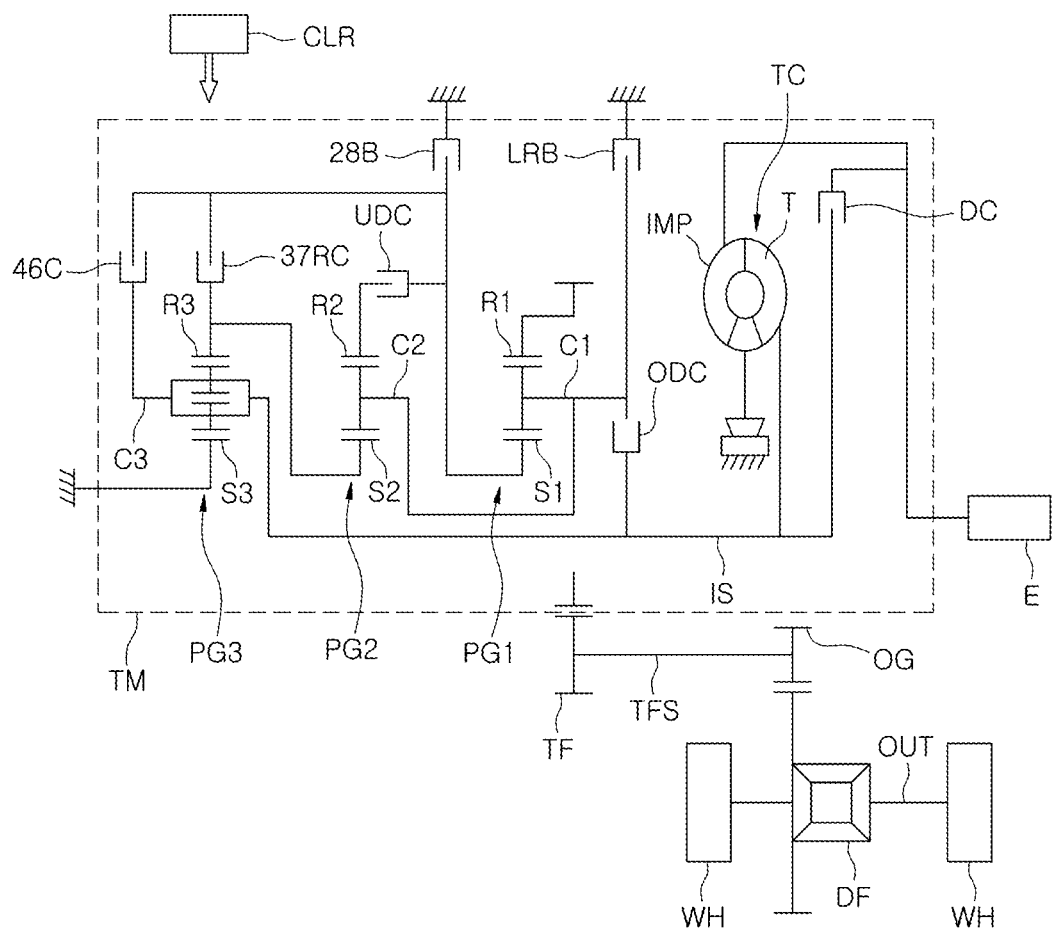
FIG. 1 illustrates a vehicle powertrain to which the present disclosure is applicable.

Hereinafter, embodiments disclosed in the present specification will be described in detail with reference to the accompanying drawings, and the same or similar elements are given the same and similar reference numerals, so duplicate descriptions thereof will be omitted.

The terms "module" and "unit" used for the elements in the following description are given or interchangeably used in consideration of only the ease of writing the specification, and do not have distinct meanings or roles by themselves.

In describing the embodiments disclosed in the present specification, when the detailed description of the relevant known technology is determined to unnecessarily obscure the gist of the present disclosure, the detailed description may be omitted. Furthermore, the accompanying drawings are provided only for easy understanding of the embodiments disclosed in the present specification, and the technical spirit disclosed herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for the purpose of distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expressions "include" or "have", etc. are intended to specify the existence of mentioned features, numbers, steps, operations, elements, components, or combinations thereof, and should be construed as not precluding the possible existence or addition of one or more other features, numbers, steps, operations, elements, components, or combinations thereof.

Referring to FIG. 1 and FIG. 2, a vehicle powertrain to which the present disclosure is applicable includes a transmission TM capable of implementing eight forward gears and a reverse gear. If power is transferred from an engine E to a torque converter TC having a damper clutch DC through an input shaft IS, the power is transferred to the transmission TM through an impeller IMP and a turbine T of the torque converter TC. The transmission TM implements the above-mentioned shift stages by three planetary gear devices and six shift elements (clutches or brakes). The power input to the transmission TM is transferred from an output element of the TM to a differential DF and an output shaft OUT to which wheels WH are connected, through a transfer gear TF and an out gear OG of a transfer shaft TFS.

The three planetary gear devices include a first planetary gear device PG1, a second planetary gear device PG2, and a third planetary gear device PG3, disposed successively from the engine E side. The first planetary gear device PG1 includes a first sun gear S1, a first carrier C1, and a first ring gear R1. The second planetary gear device PG2 includes a second sun gear S2, a second carrier C2, and a second ring gear R2. The third planetary gear device PG3 includes a third sun gear S3, a third carrier C3, and a third ring gear R3.

The six shift elements include a low reverse brake LRB, a 28-brake 28B, an overdrive clutch ODC, an underdrive clutch UDC, a 37R clutch 37RC, and a 46-clutch 46C. A controller CLR configured to communicate with various vehicle sensors or other controllers (for example, engine controller) may form an appropriate control hydraulic pressure, thereby controlling the shift elements.

Substantially, a transmission control unit (TCU) or the like may be the controller CLR which controls the transmission TM included in the powertrain as described above.

The above-described powertrain may be modeled by the following equations:

$$(1+\gamma_1)\omega_{C2} = \gamma_1 \omega_{R1} + \omega_{S1} \quad \text{Equation 1:}$$

$$(1+\gamma_2)\omega_{C2} = \gamma_2 \omega_{R2} + \omega_{S2} \quad \text{Equation 2:}$$

$$(-1+\gamma_3)\omega_T = \gamma_3 \omega_{S2} \quad \text{Equation 3:}$$

$$\omega_{R1} = \gamma_{TF} \omega_{TF} \quad \text{Equation 4:}$$

$$\omega_{TF} = -\gamma_{OG} \omega_{OUT} \quad \text{Equation 5:}$$

$$T_{R1} = \gamma_1 T_{S1} \quad \text{Equation 6:}$$

$$T_{R2} = \gamma_2 T_{S2} \quad \text{Equation 7:}$$

$$T_{R3} = -\gamma_3 T_{S3} \quad \text{Equation 8:}$$

$$T_{Imp} = \gamma_4 T_T \quad \text{Equation 9:}$$

$$I_T \dot{\omega}_T = T_T + T_{DC} - T_{IS} \quad \text{Equation 10:}$$

$$I_{IS} \dot{\omega}_{IS} = T_{IS} - T_{OD} - T_{46} + T_{S3} + T_{R3} \quad \text{Equation 11:}$$

$$I_{S1} \dot{\omega}_{S1} = -T_{UD} + T_{37R} + T_{46} - T_{28} - T_{S1} \quad \text{Equation 12:}$$

$$I_{R2} \dot{\omega}_{R2} = T_{OD} - T_{LR} + T_{S1} + T_{R1} - T_{R2} \quad \text{Equation 13:}$$

$$I_{R1} \dot{\omega}_{R1} = -T_{R1} - T_{TF} \quad \text{Equation 14:}$$

$$I_{S2} \dot{\omega}_{S2} = -T_{37R} - T_{S2} - T_{R3} \quad \text{Equation 15:}$$

$$I_{C2} \dot{\omega}_{C2} = T_{UD} + T_{S2} + T_{R2} \quad \text{Equation 16:}$$

$$0 = -T_{S3} - T_{S3W} \quad \text{Equation 17:}$$

$$I_{TF} \dot{\omega}_{TF} = \gamma_{TF} T_{TF} - T_{OG} = \gamma_{TF} T_{TF} - \frac{T_{OUT}}{\gamma_{OG}} \quad \text{Equation 18}$$

$$I_{DF} \dot{\omega}_{OUT} = \gamma_{OG} T_{OG} - T_{RD} = T_{OUT} - T_{RD} \quad \text{Equation 19:}$$

$$I_C \dot{\omega}_C = -T_E - T_{MT} + T_{28} + T_{LR} + T_{S3} \quad \text{Equation 20:}$$

$$I_E \dot{\omega}_E = T_E - T_{DC} - T_{Imp} \quad \text{Equation 21:}$$

In the equations:

$\gamma_1$: gear ratio (number of ring gear teeth/number of sun gear teeth) of the first planetary gear device PG1

$\gamma_2$: gear ratio of the second planetary gear device PG2

$\gamma_3$: gear ratio of the third planetary gear device PG3

$\gamma_{TF}$: gear ratio between the transmission output element and the transfer gear TF For reference, the transmission output element becomes the first ring gear R1 of the first planetary gear device PG1.

$\gamma_{OG}$: gear ratio between the out gear OG and the output shaft OUT

For reference, the output shaft OUT may be understood as including the differential DF meshing with the out gear OG, the output shaft OUT coupled to the differential DF, and the wheels WH, and more precisely, as the gear ratio between the out gear OG and the ring gear of the differential DF.

$\gamma_4$: torque ratio of the torque converter TC $\omega_{S1}$: angular velocity of the first sun gear S1 of the first planetary gear device PG1

$\omega_{R1}$: angular velocity of the first ring gear R1 of the first planetary gear device PG1

$\omega_{S2}$: angular velocity of the second sun gear S2 of the second planetary gear device PG2

$\omega_{C2}$: angular velocity of the second carrier C2 of the second planetary gear device PG2

$\omega_{R2}$: angular velocity of the second ring gear R2 of the second planetary gear device PG2

$\omega_T$: angular velocity of the turbine T $\omega_{TF}$: angular velocity of the transfer gear TF $\omega_{OUT}$: angular velocity of the output shaft OUT $\dot{\omega}_T$: angular acceleration of the turbine T $\dot{\omega}_{IS}$: angular acceleration of the input shaft IS $\dot{\omega}_{S1}$: angular acceleration of the first sun gear S1 of the first planetary gear device PG1

$\dot{\omega}_{R1}$: angular acceleration of the first ring gear R1 of the first planetary gear device PG1

$\dot{\omega}_{S2}$: angular acceleration of the second sun gear S2 of the second planetary gear device PG2

$\dot{\omega}_{C2}$: angular acceleration of the second carrier C2 of the second planetary gear device PG2

$\dot{\omega}_{R2}$: angular acceleration of the second ring gear R2 of the second planetary gear device PG2

$\dot{\omega}_{TF}$: angular acceleration of the transfer gear TF $\dot{\omega}_{OUT}$: angular acceleration of the output shaft OUT $\dot{\omega}_C$: angular acceleration of the transmission case TMC $\dot{\omega}_E$: angular acceleration of the engine E $T_{S1}$: torque of the first sun gear S1 of the first planetary gear device PG1

$T_{R1}$: torque of the first ring gear S1 of the first planetary gear device PG1

$T_{S2}$: torque of the second sun gear S2 of the second planetary gear device PG2

$T_{R2}$: torque of the second ring gear S2 of the second planetary gear device PG2

$T_{S3}$: torque of the third sun gear S3 of the third planetary gear device PG3

$T_{R3}$: torque of the third ring gear R3 of the third planetary gear device PG3

$T_{S3W}$: reactive torque of the transmission case TMC against the third ring gear R3 of the third planetary gear device PG3

$T_{Imp}$: torque of the impeller IMP $T_T$: torque of the turbine T $T_{DC}$: torque of the damper clutch DC $T_{IS}$: torque of the input shaft IS $T_{OD}$: torque of the overdrive clutch ODC $T_{46}$: torque of the 46-clutch 46C $T_{UD}$: torque of the underdrive clutch UDC $T_{37R}$: torque of the 37R clutch 37RC $T_{28}$: torque of the 28-brake 28B $T_{LR}$: torque of the low reverse brake LRB $T_{TF}$: torque of the transfer gear TF $T_{OG}$: torque of out gear OG $T_{OUT}$: torque of the output shaft OUT $T_{RD}$: traveling-resistance torque $T_E$: torque of the engine $T_{MT}$: transmission TM mounting torque $I_T$: moment of inertia of the turbine T $I_{IS}$: moment of inertia of the input shaft IS $I_{S1}$: moment of inertia of the first sun gear S1 of the first planetary gear device PG1

$I_{R1}$: moment of inertia of the first ring gear R1 of the first planetary gear device PG1

$I_{S2}$: moment of inertia of the second sun gear S2 of the second planetary gear device PG2

$I_{C2}$: moment of inertia of the second carrier C2 of the second planetary gear device PG2

$I_{R2}$: moment of inertia of the second ring gear R2 of the second planetary gear device PG2

$I_{TF}$: moment of inertia of the transfer shaft TFS $I_{DF}$: moment of inertia of the output shaft OUT $I_C$: moment of inertia of the transmission case TMC $I_E$: moment of inertia of the engine E Equations 1 to 3 given above describe angular velocity/gear ratio relations regarding rotating elements constituting the planetary gear devices of the transmission TM.

Equations 4 and 5 given above describe angular velocity/gear ratio relations regarding components that constitute the power transmission path from the output element of the transmission TM to the output shaft OUT to which wheels WH are connected, among components of the powertrain.

Equations 6 to 8 given above describe torque/gear ratio relations regarding rotating elements constituting the planetary gear devices of the transmission TM.

Equation 9 given above describes a torque/gear ratio relation regarding rotating elements that constitute the torque converter TC, that is, the impeller IMP and the turbine T.

Equations 10 to 21 given above establish relations between angular acceleration, moment of inertia, and torque with regard to respective rigidly connected units of powertrain components.

Figure 3:
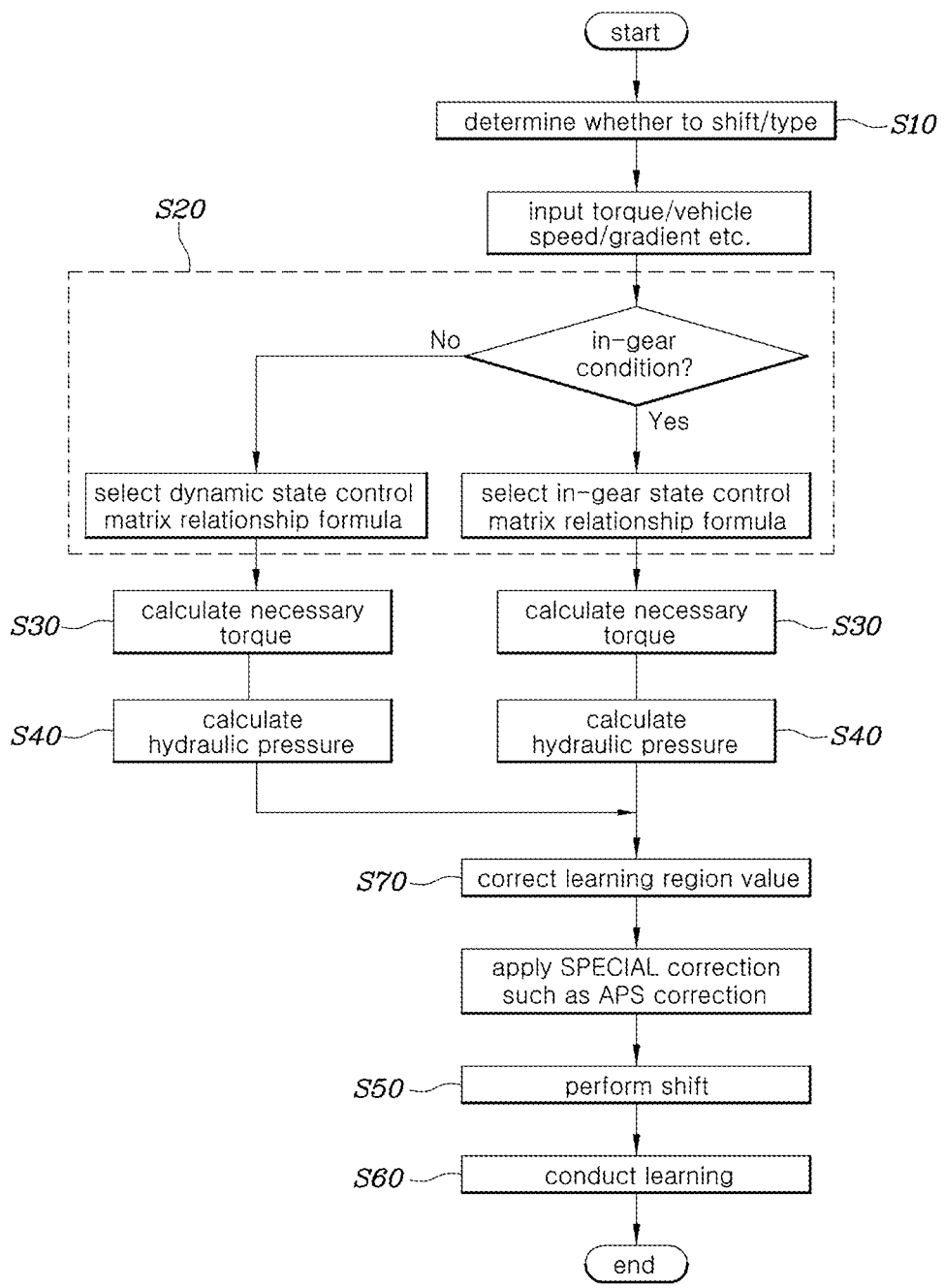
FIG. 3 is a flowchart illustrating a basic shift control method according to the present disclosure.

Referring to FIG. 3, a basic shift control method according to the present disclosure includes a step (S10) in which the controller CLR determines whether the controller CLR is shifting the transmission TM and, in the case of shifting, determines the type of shifting, a step (S20) in which a predetermined control matrix H is selected according to whether the transmission TM is being shifted and the type of shifting, a step (S30) in which the necessary torque of a control target shift element is calculated on the basis of the selected control matrix H, a step (S40) in which a control hydraulic pressure for implementing the necessary torque of the control target shift element is calculated, and a step (S50) in which the control target shift element is controlled by using the calculated control hydraulic pressure.

Obviously, the series of steps described above are performed continuously and repeatedly not only during a shift, but also while the vehicle travels.

The control matrix H is calculated by using relations between the angular velocity, angular acceleration, moment of inertia, and torque of powertrain components as in Equations 1 to 21 given above, and boundary conditions based on the state of the transmission TM.

The control matrix H is calculated by multiplying the inverse matrix of an angular acceleration dominant matrix (A_G) including coefficients of angular acceleration terms of the relation equations by an external torque dominant matrix C_G including coefficients of external torque terms of the relation equations.

The external torques refer to torques which can be controlled by the controller CLR, or which are input to the powertrain from the outside, and correspond to a total of 13 torques in Equations 1 to 21 given above, including turbine T torque $T_T$, traveling-resistance torque $T_{RD}$, damper clutch DC torque $T_Dc$, overdrive clutch ODC torque $T_{OD}$, underdrive clutch UDC torque $T_{UD}$, 46-clutch 46C $T_{46}$, 28-brake 28B torque $T_{28}$, 37R clutch 37RC torque $T_{37R}$, low reverse brake $T_{LR}$, engine E torque $T_E$, input shaft IS torque $T_{IS}$, transmission TM mounting torque $T_{MT}$, and impeller IMP torque $T_{Imp}$.

Figure 4:
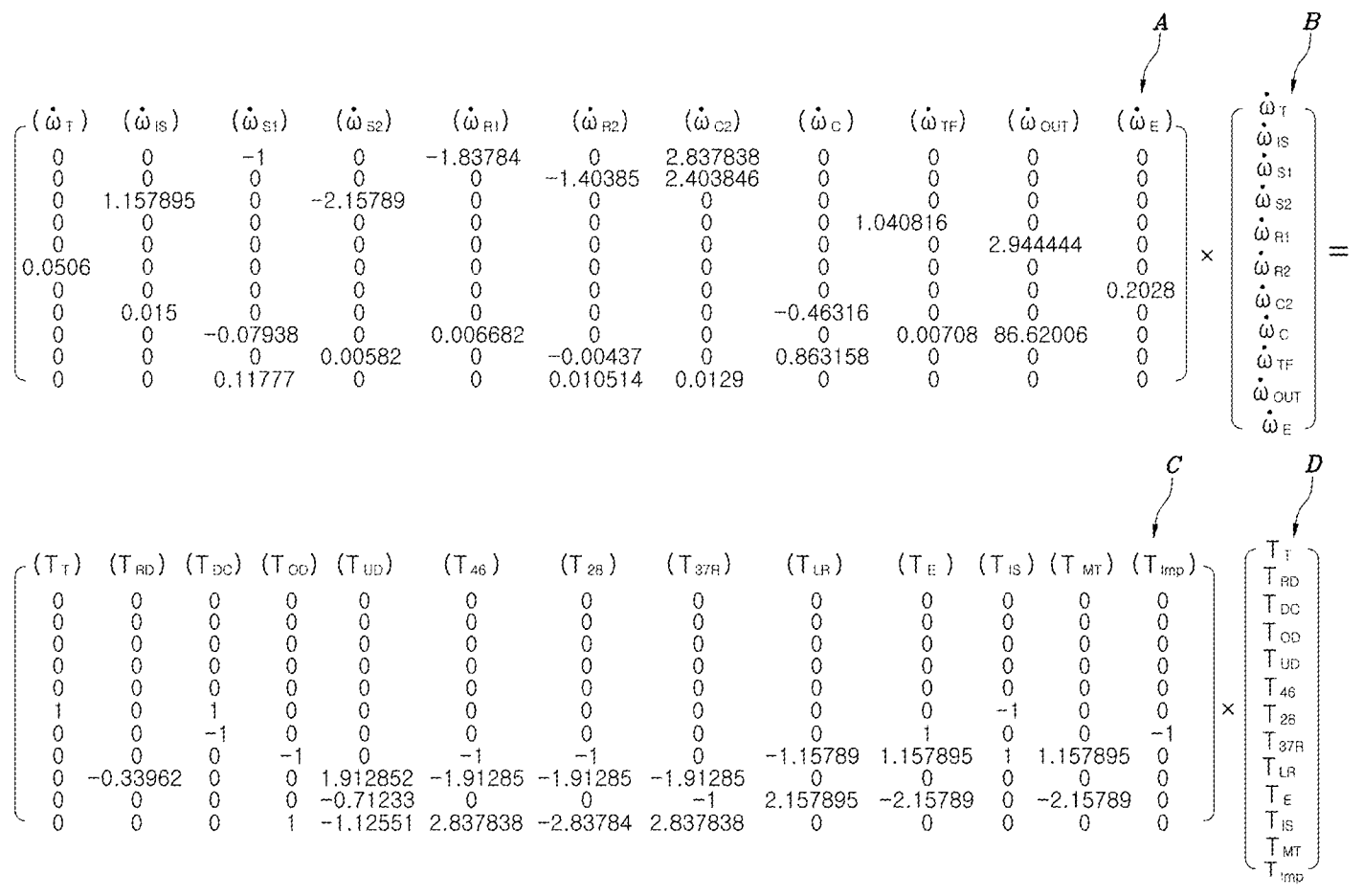

In order to make the angular acceleration dominant matrix A_G, Equations 1 to 21 given above are used to make a matrix equation meaning that, as in FIG. 4, the product an angular acceleration coefficient matrix A and an angular acceleration column vector B is equal to the product of an external torque coefficient matrix C and an external torque column vector D.

That is, the matrix equation in FIG. 4 may mean that A*B=C*D.

For reference, parentheses at the top of the angular acceleration coefficient matrix A in FIG. 4 are reference marks indicating what angular accelerations the coefficients of respective columns correspond to, and parentheses at the top of the external torque coefficient matrix are reference marks indicating what external torques the coefficients of respective columns correspond to.

Specifically, the angular acceleration coefficient matrix A is made in the following manner: in the case of Equations 1 to 5, these equations are differentiated and changed to angular acceleration relation equations. Al terms are then moved to the left side, and the right side is made zero. The angular acceleration terms on the left side are then described as a product of an angular acceleration coefficient matrix and an angular acceleration column vector.

The five rows on the upper side of the angular acceleration coefficient matrix A in FIG. 4 correspond to Equations 1 to 5 given above described in the above-mentioned method.

The left side of the equal sign contains a product of the angular acceleration coefficient matrix and the angular acceleration column vector, and although all values on the right side are zeros, this is expressed as a product of an external torque coefficient matrix, all factors of which have zero values, and an external torque column vector. An angular acceleration coefficient matrix and an external torque coefficient matrix regarding Equations 6 to 21 given above are then prepared to be merged below the angular acceleration coefficient matrix and the external torque coefficient matrix regarding Equations 1 to 5 given above, respectively.

Meanwhile, Equations 6 to 21 given above include internal torque terms which represent torques other than the external torque represented by the external torque terms. These internal torque terms and angular acceleration terms having an algebraic relation, is eliminated and arranged, give six arranged relation equations including angular acceleration terms of the powertrain components and the external torque terms.

In connection with the six arranged relation equations obtained as above, angular acceleration terms are solely placed on the left side of the equal sign, and external torque terms are solely placed on the right side. The left side is then expressed as a product of an angular acceleration coefficient matrix and an angular acceleration column vector, and the right side is expressed as a product of an external torque coefficient matrix and an external torque column vector. By merging the same below the angular acceleration coefficient matrix and the external torque coefficient matrix regarding Equations 1 to 5 given above, respectively, a matrix equation is obtained, as in FIG. 4, which models the control target vehicle powertrain.

For reference, in the present embodiment, the internal torque includes the torque $T_{S1}$ of the first sun gear S1 of the first planetary gear device PG1, the torque $T_{R1}$ of the first ring gear S1 of the first planetary gear device PG1, the torque $T_{S2}$ of the second sun gear S2 of the second planetary gear device PG2, the torque $T_{R2}$ of the second ring gear S2 of the second planetary gear device PG2, the torque $T_{S3}$ of the third sun gear S3 of the third planetary gear device PG3, the torque $T_{R3}$ of the third ring gear R3 of the third planetary gear device PG3, the torque $T_{TF}$ of the transfer gear, the $T_{OUT}$ torque of the output shaft OUT, the transmission TM mounting torque $T_{MT}$, and the like.

As described above, FIG. 4 illustrates a state in which the angular acceleration terms of Equations 1 to 21 are separated into a product of an angular acceleration coefficient matrix A and an angular acceleration column vector B, and placed on one side of the equal sign. On the other side, external torque terms of the relation equations are separated into a product of an external torque coefficient matrix C and an external torque column vector D.

Figure 5:
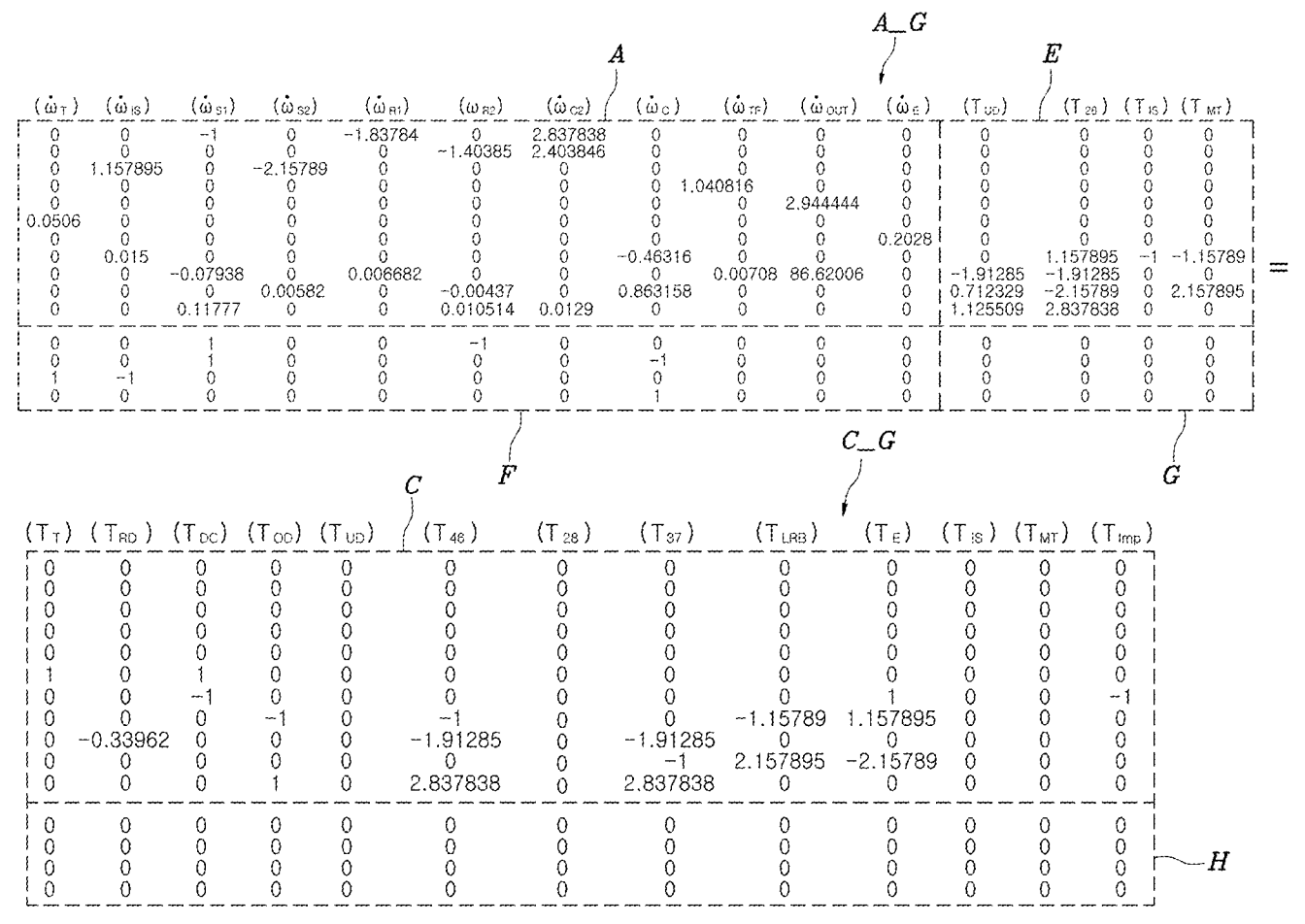

The angular acceleration dominant matrix A_G is configured in the following manner: as illustrated in FIG. 5, columns of coefficients regarding external torque terms which may be regarded as being in a completely connected state, among the powertrain components, and thus may be considered as linear parameters changed by a torque input to the powertrain, are multiplied by −1, and the resulting rigid connection matrix E is connected and placed to the right of the angular acceleration coefficient matrix A;

a boundary condition matrix F including rows expressing a boundary condition according to the state of the transmission TM is connected and placed beneath the angular acceleration coefficient matrix A; and a dummy matrix G filled with 0 is placed at the location of intersection between the rigid connection matrix E and the boundary condition matrix F of the angular acceleration coefficient matrix A, thereby configuring a square matrix.

In FIG. 5, in order to avoid the complexity of the matrix equation in FIG. 4, the angular acceleration column vector B and the external torque column vector D are omitted from both sides, and the rigid connection matrix E, the boundary condition matrix F, and the dummy matrix G are connected to the angular acceleration coefficient matrix.

For example, the angular acceleration column vector B mentioned herein, although expressed like this, is to be understood substantially as a state column vector J B' (described later).

Meanwhile, the external torque dominant matrix C_G is displayed on the right side in FIG. 5. The external torque dominant matrix C_G includes a dummy matrix H obtained by filling columns used for the rigid connection matrix E, among the external torque coefficient matrix C in FIG. 4, with zero, and filling rows corresponding to the boundary condition matrix F of the angular acceleration coefficient matrix A with zero.

In FIG. 5, external torques related to coefficients of the rigid connection matrix E include underdrive clutch UDC torque, 28-brake 28B torque, input shaft IS torque, and transmission TM mounting torque. These correspond to external torques which may be regarded as being in a completely connected state, and thus may be considered as linear parameters changed by the torque input to the powertrain.

The angular acceleration dominant matrix in FIG. 5 exemplifies a forward second-stage in-gear state of the transmission TM. As illustrated in FIG. 2, in the forward second stage, the underdrive clutch UDC and the 28-brake 28B are engaged. Therefore, they may be regarded as being in a completely connected state, the input shaft IS may be regarded as being in a completely connected state, with its own elastic deformation component ignored, and the transmission TM may also be regarded as being mounted in a completely connected state without elastic deformation. Coefficients of these external torques are thus moved to the left side, thereby constituting the rigid connection matrix E.

In addition, the boundary condition matrix F is made in the following manner: since the transmission TM is in a forward second-stage in-gear state, the underdrive clutch UDC is engaged as described above, and the 28-brake 28B is engaged. The first sun gear S1 and the second ring gear R2, which are connected to each other by the underdrive clutch UDC, thus have the same angular acceleration. Since the 28-brake 28B is engaged, the angular acceleration of the first sun gear S1 is identical to the angular acceleration of the transmission case TMC. Since the input shaft IS is directly connected to the turbine T, and if elastic formation of the input shaft Is itself is ignored as described above, the angular acceleration of the turbine T is identical to the angular acceleration of the input shaft IS, and the angular acceleration of the transmission case TMC is 0.

That is, since the first sun gear S1 and the second ring gear R2 have the same angular acceleration, $$\dot{\omega}_{S1}=\dot{\omega}_{R2}$$

Since the angular acceleration of the first sun gear S1 is identical to the angular acceleration of the transmission case TMC, $$\dot{\omega}_{S1}=\dot{\omega}_C$$

Since the acceleration of the turbine T is identical to the angular acceleration of the input shaft IS, $$\dot{\omega}_T=\dot{\omega}_{IS}$$

Since the acceleration of the transmission case TMC is 0, $$\dot{\omega}_C=0$$

Coefficients obtained by moving all terms of the four equations above to the right side, respectively, constitute the boundary condition matrix F.

Therefore, it may be considered that the angular acceleration dominant matrix A_G is configured as follows the angular velocity/gear ratio relation equation regarding rotating elements constituting planetary gear devices of the transmission TM is differentiated and changed to an angular acceleration relation equation, all terms are then moved to one side, thereby making the other side 0, the angular acceleration terms placed on one side are separated into a product of an angular acceleration coefficient matrix and an angular acceleration column vector, and the separated angular acceleration coefficient matrix is included in the angular acceleration dominant matrix A_G.

In addition, it may be considered that the angular acceleration dominant matrix A_G is configured as follows an angular velocity/gear ratio relation regarding components that constitute a power transmission path from the output element of the transmission TM to the output shaft OUT to which wheels WH are connected, among components of the powertrain, is differentiated and changed to an angular acceleration relation equation, all terms are then moved to one side, thereby making the other side 0, the angular acceleration terms placed on one side are separated into a product of an angular acceleration coefficient matrix and an angular acceleration column vector, and the separated angular acceleration coefficient matrix is included in the angular acceleration dominant matrix A_G.

In addition, it may be considered that the angular acceleration dominant matrix A_G is configured as follows arranged relation equations including angular acceleration terms of the powertrain components and the external torque terms are calculated from a torque/gear ratio relation equation regarding rotating elements that constitute planetary gear devices of the transmission TM, a torque/gear ratio relation equation regarding rotating elements that constitute the torque converter TC, and an angular acceleration/moment-of-inertia/torque relation regarding the powertrain components, the angular acceleration terms of the powertrain components and the external torque terms are divided and placed on both sides, the angular acceleration terms placed on one side are separated into a product of an angular acceleration coefficient matrix and an angular acceleration column vector, and the separated angular acceleration coefficient matrix is included in the angular acceleration dominant matrix A_G.

The control matrix H may be obtained by multiplying the inverse matrix of the angular acceleration dominant matrix A_G obtained as above by the external torque dominant matrix.

The control matrix H includes in-gear state control matrices H regarding an in-gear state (not in the middle of shifting) of the transmission TM, and a dynamic state control matrix H regarding a during-shifting state.

That is, one in-gear state control matrix H is provided for each shift stage that the transmission TM can implement, and one dynamic state control matrix H is provided for each shift element that remains engaged during shifting.

The controller CLR selects a control matrix H regarding a shift element that remains engaged continuously before/after shifting, among the dynamic state control matrices H, if the transmission TM is shifting, and selects an in-gear state control matrix H provided for each corresponding shift stage if the transmission TM is not shifting.

Therefore, it may be considered that, in order to control the powertrain transmission TM as in FIG. 1 in a manner as in FIG. 2, a total of 12 control matrices H are necessary, including control matrices H in first to eighth in-gear states, a dynamic state control matrix H in a state in which the underdrive clutch UDC is engaged, a dynamic state control matrix H in a state in which the overdrive clutch ODC is engaged, a dynamic state control matrix H in a state in which the 37R clutch 37RC is engaged, and a dynamic state control matrix H in a state in which the 28-brake 28B is engaged.

The dynamic state control matrix H in a state in which the 37R clutch 37RC is engaged, and dynamic state control matrix H in a state in which the 28-brake 28B is engaged, may be understood as dynamic state control matrices H regarding shift elements that remain engaged during a skip shift (a shift conducted while skipping middle shift stages).

Figure 6:
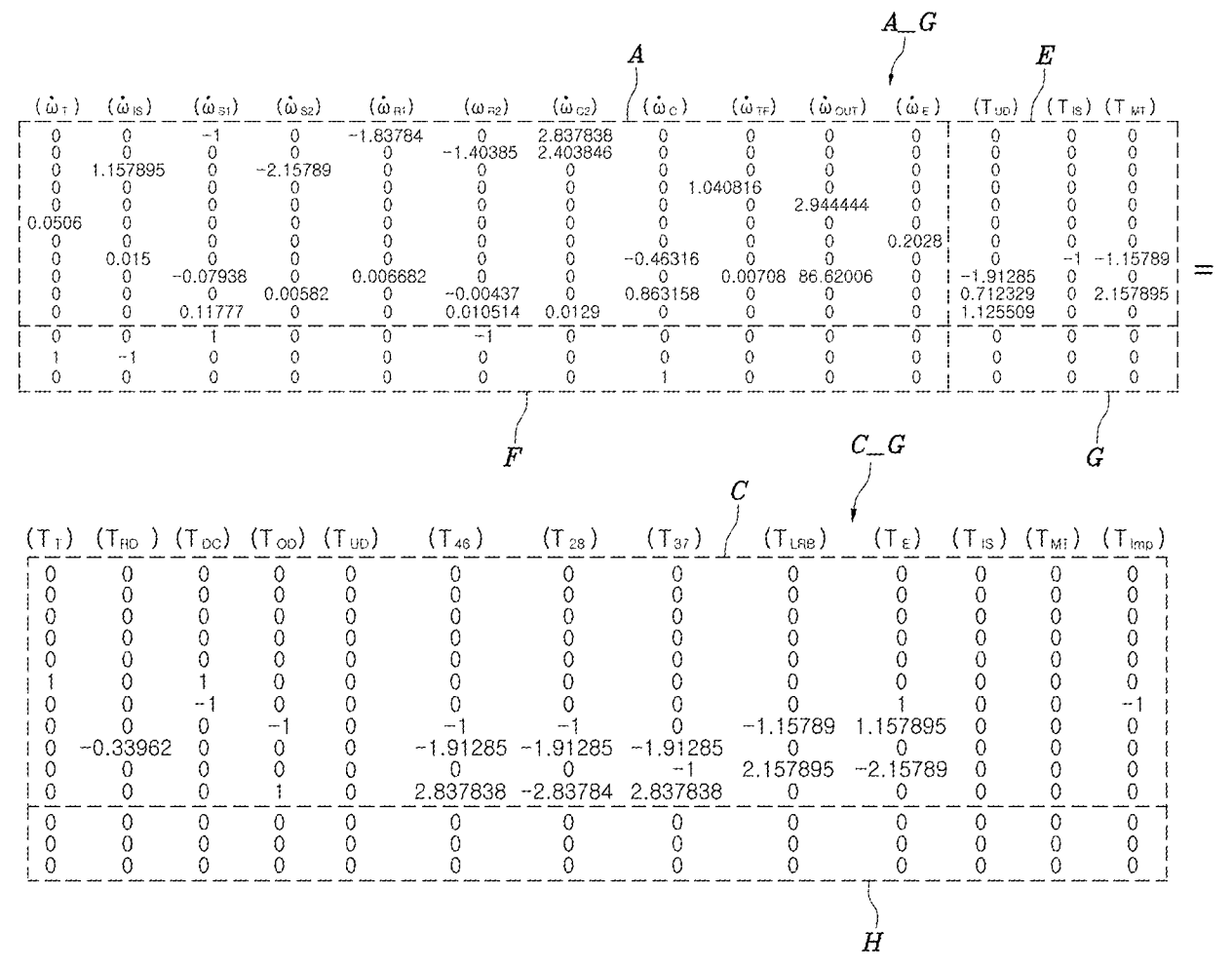

For reference, FIG. 6 illustrates the relation between the angular acceleration dominant matrix A_G and the external torque dominant matrix C_G for obtaining the dynamic state control matrix H in a state in which the underdrive clutch UDC is engaged, with state column vectors and external torque column vectors omitted therefrom as in FIG. 5.

Therefore, the dynamic state control matrix H in a state in which the underdrive clutch UDC is engaged is obtained by multiplying the inverse matrix of the angular acceleration dominant matrix A_G on the left side in FIG. 6 by the external torque dominant matrix C_G on the right side.

The necessary torque of the control target shift element is calculated from a control matrix H relation equation meaning that a product of the right of the control matrix H and the external torque column vector D is equal to a state column vector J obtained by successively arranging angular accelerations corresponding to respective columns of the angular acceleration dominant matrix A_G and external torques.

The state column vector J is obtained by successively connecting and placing external torques related to coefficients of the rigid connection matrix E beneath the angular acceleration column vector B.

Substantially, the column vector by which the right of the angular acceleration dominant matrix on the left side in FIG. 5 is multiplied is not the angular acceleration column vector, but the state column vector J.

That is, the angular acceleration dominant matrix A_G in FIG. 5 is obtained by connecting the rigid connection matrix E to the right of the angular acceleration coefficient matrix A in FIG. 4, and the column vector by which the angular acceleration dominant matrix A_G is multiplied needs to include external torques multiplied by coefficients of the rigid connection matrix E beneath the angular acceleration column vector B. The state column vector J is made in this manner.

Figure 7:
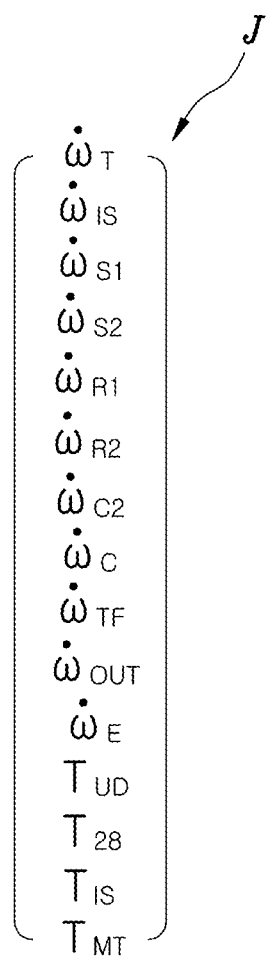
FIG. 7 illustrates a state column vector omitted from FIG. 5.
Figure 8:
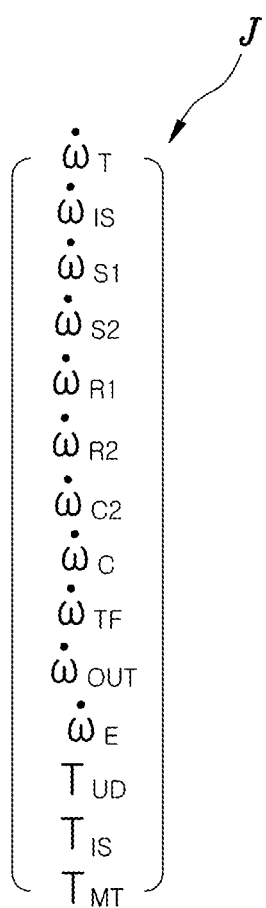
FIG. 8 illustrates a state column vector omitted from FIG. 6.

FIG. 7 illustrates the state column vector J omitted from FIG. 5, and FIG. 8 illustrates the state column vector J omitted from FIG. 6.

The control matrix H relation equation for calculating the necessary torque of the release-side shift element, among the control target shift elements, uses the current shift stage's in-gear state control matrix H for the control matrix H.

For example, assuming that the transmission TM in FIG. 1 shifts from the second stage to the third stage, the underdrive clutch remains engaged, as illustrated in FIG. 2, the 28-brake 28B is disengaged, and the 37R clutch 37RC is engaged, thereby shifting the gear.

Therefore, in this case, the control matrix H relation equation for calculating the necessary torque of the release-side shift element (28-brake 28B) uses the current shift stage (second stage) in-gear state control matrix H for the control matrix H.

For reference, FIG. 9 illustrates the control matrix H relation equation for which the second-stage in-gear state control matrix H is used. This is used to calculate the necessary torque of the release-side shift element (28-brake 28B).

The necessary torque of the release-side shift element is calculated in the following manner: among rows of the state column vector J in the control matrix H relation equation, a row of the control matrix H identical to a row of an external torque corresponding to the torque of the release-side shift element is multiplied by the external torque column vector. From a partial relation equation stating that the product is equal to the necessary torque of the release-side shift element, external torque terms which are irrelevant to the current transmission TM state, or which are negligible, are omitted (made zero).

Remaining external torque terms other than the turbine torque and the traveling-resistance torque are external torque terms which are irrelevant to the current transmission TM state, or which are negligible. Therefore, the necessary torque of the release-side shift element can be calculated from a relation equation obtained by deleting them all (making them zero).

That is, in FIG. 9, among rows of the state column vector J, a row of the control matrix H identical to a row of the 28-brake 28B torque is multiplied by the external torque column vector, and external torque terms other than the turbine torque and the traveling-resistance torque are omitted (made zero) and then arranged. The resulting equation is as follows:

$$T_{28} = -1.017 T_T - 0.002 T_{RD}$$

The controller CLR may calculate the necessary torque of the release-side shift element (28-brake 28B) by inputting the turbine torque and the traveling-resistance torque to the above equation, and may calculate a control hydraulic pressure for satisfying the necessary torque calculated in this manner, thereby controlling the 28-brake 28B.

The turbine torque and the traveling-resistance torque correspond to information that may be received from vehicle sensors, other controllers, or the like.

In order to calculate a coupling-side basic preparatory hydraulic pressure P1 of a coupling-side shift element necessary to prevent a shifting sag phenomenon immediately before starting a shift of the transmission TM, the controller CLR use the control matrix H relation equation for calculating the necessary torque of the release-side shift element.

That is, the controller CLR obtains a partial relation equation stating that the product of a row of the control matrix H identical to an angular acceleration row of the output shaft OUT, to which wheels WH are connected, of the state column vector J, in the control matrix H relation equation, and the external torque column vector is equal to the angular acceleration of the output shaft OUT, deletes (makes them zero) remaining external torque terms other than the turbine torque and the traveling-resistance torque, among the external torque terms, and then calculates the angular acceleration of the output shaft OUT.

This can be expressed by the following equation:

$$\dot{\omega}_{OUT} = 0.034 T_T - 0.004 T_{RD}$$

As used herein, the shifting sag phenomenon refers to a phenomenon in which the vehicle acceleration temporarily drops excessively immediately before a shift is started, and this tends to occur because the control hydraulic pressure of the coupling shift element acts more or less excessively, and the vehicle's output shaft OUT angular acceleration temporarily drops excessively.

Therefore, by calculating the necessary torque of the coupling-side shift element such that the output shaft OUT angular acceleration drops only about 5%, by calculating the control hydraulic pressure on the basis thereof, and by controlling the coupling-side shift element accordingly, the output shaft OUT angular acceleration can be prevented from dropping excessively, thereby reducing or preventing the above-mentioned shifting sag phenomenon.

To this end, in the case of the present embodiment, in order to calculate the coupling-side basic preparatory hydraulic pressure P1 of the coupling-side shift element (37R clutch 37RC) necessary to prevent the shifting sag phenomenon, the calculated angular acceleration of the output shaft OUT is decreased by a predetermined amount of acceleration decrease, thereby obtaining a corrected output shaft angular acceleration.

The corrected output shaft angular acceleration may be determined as $0.956\dot{\omega}_{OUT}$ such that the output shaft OUT angular acceleration drops only 5%.

Thereafter, a partial relation equation is obtained, which states that the product of a row of the control matrix H identical to an angular acceleration row of the output shaft OUT, to which wheels WH are connected, of the state column vector J, in the control matrix H relation equation, and the external torque column vector is equal to the angular acceleration of the output shaft OUT. Remaining external torque terms other than the turbine torque and the traveling-resistance torque, among the external torque terms, are then deleted (made zero), the corrected output shaft angular acceleration is then replaced by the angular acceleration of the output shaft OUT, and the torque of the coupling-side shift element is calculated.

This can be expressed by the following equation:

$$T_{37R}=1/0.018\times(-0.034T_T+0.004T_{RD}+0.95\dot{\omega}_{OUT})$$

Therefore, the controller CLR may calculate the necessary torque of the 37R clutch 37RC necessary to prevent the shifting sag phenomenon through the above equation, may then calculate a control hydraulic pressure for implementing the torque of the coupling-side shift element calculated as described above, may then determine the same as the coupling-side basic preparatory hydraulic pressure P1 of the coupling-side shift element necessary to prevent the shifting sag phenomenon, and may control the coupling-side shift element by the coupling-side basic preparatory hydraulic pressure P1 immediately before shifting, thereby preventing or reducing the shifting sag phenomenon, improving the vehicle's shifting quality, and ultimately improving the vehicle's commercial value.

Meanwhile, the controller CLR may calculate a control hydraulic pressure of a shift element for maintaining the in-gear state of the transmission TM through the control matrix H relation equation using an in-gear state control matrix H as described above, and may apply the same to line pressure management of the transmission TM hydraulic pressure system.

For example, in a second-stage in-gear state, a line pressure is necessary to maintain the underdrive clutch torque. Therefore, the controller CLR may calculate the underdrive clutch torque by using a relation equation corresponding to a row of the underdrive clutch torque in the state column vector J in FIG. 9, and may calculate a control hydraulic pressure to be provided to the underdrive clutch torque through this, thereby calculating the line pressure that the transmission TM hydraulic pressure system is supposed to maintain on the basis thereof.

That is, the controller CLR may calculate the underdrive clutch necessary torque by using the following relation equation:

$$T_{UD}=20.563T_T+0.006T_{RD}$$

The control matrix H relation equation for calculating the necessary torque of the coupling-side shift element, among the control target shift elements, uses a dynamic state control matrix H regarding a shift element that remains engages before and after the corresponding shift, as the control matrix H.

That is, when shifting from the second stage to the third stage, the shift element that remains engages before and after the shift is the underdrive clutch. In this case, there control matrix H relation equation thus use a dynamic stat control matrix H regarding the underdrive clutch as the control matrix H.

FIG. 10 illustrates a control matrix H relation equation which uses a dynamic state control matrix H regarding the underdrive clutch as the control matrix H.

Among the necessary torque of the coupling-side shift element, the coupling-side basic target torque of the coupling shift element for entering an inertia phase IP in which the turbine T angular velocity beings to decrease is obtained as follows: a partial relation equation is obtained, which states that the product of a row of the control matrix H identical to the turbine T angular acceleration row among rows of the state column vector J, in the control matrix H relation equation, and the external torque column vector is equal to the turbine T angular acceleration. The turbine T angular acceleration is regarded as 0, and remaining external torque terms other than the turbine torque, the traveling-resistance torque, and the coupling-side shift element's torque, among the external torque terms, are then deleted (made zero). The coupling-side shift element's torque is calculated from the resulting relation equation, and determined as the coupling-side shift element's coupling-side basic target torque.

That is, the coupling-side basic target torque of the coupling-side shift element (37R clutch 37RC) may be calculated through the following equation:

$$T_{37R}=1/13.23\times(80.901T_T-0.014T_{RD})$$

For reference, in this equation, the turbine T angular acceleration $\dot{\omega}_T$ is regarded as zero.

The reason the turbine T angular acceleration $\dot{\omega}_T$ is regarded as zero is as follows: during a power-on upshift, the turbine T angular velocity increases over time during a torque phase and tends to decrease in an inertia phase IP. The torque of the coupling-side shift element when the turbine T angular velocity reaches the maximum value during the shift may thus be considered as the coupling-side basic target torque of the coupling-side shift element.

Obviously, the coupling-side basic target torque is converted into a coupling-side basic target pressure P4 for accomplishing this, and then provided to the coupling-side shift element (37R clutch 37RC).

The controller CLR deletes (make them zero) remaining external torque terms other than the turbine torque, the traveling-resistance torque, and the coupling-side shift element's torque, among the external torque terms, from the partial relation equation of the control matrix H relation equation used to obtain the necessary torque of the coupling-side shift element, replaces the turbine T target change rate per unit time by the turbine T angular acceleration, controls the coupling-side shift element by the coupling-side basic target torque, and then calculates the torque of the coupling-side shift element that is to be changed (PID torque).

That is, assuming a shift from the second stage to the third stage, the coupling-side shift element is the 37R clutch 37RC, and this may be expressed by the following equation:

$$T_{37R\_PID}=1/13.23\times(80.901T_T-0.014T_{RD}-\Delta\dot{\omega}_T)$$

wherein $T_{37R\_PID}$ refers to the PID torque of the coupling-side shift element, and $\Delta\dot{\omega}_T$ refers to the turbine T target change rate per unit time, and is calculated by dividing the turbine T angular velocity supposed to be changed during a shift target time by the shift target time. The controller CLR may calculate the shift target time and the turbine T angular velocity supposed to be changed during the shift target time by using conventional known technologies in view of the shifting situation.

The controller CLR corrects the PID torque by using the difference between the target value and measured value of the turbine T angular velocity while performing the inertia phase IP as a feedback component, then calculates a hydraulic pressure for implementing the PID torque of the coupling-side shift element corrected as described above, and repeatedly determines the same as a PID control hydraulic pressure by which the coupling-side shift element is to be changed during the shift target time.

Meanwhile, the controller CLR deletes (make them zero) remaining external torque terms other than the turbine torque, the traveling-resistance torque, and the necessary torque of the coupling-side shift element, among the external torque terms, from the partial relation equation of the control matrix H relation equation used to obtain the necessary torque of the coupling-side shift element, replaces the turbine T target change rate per unit time by the turbine T angular acceleration, calculates the turbine torque, and performs an engine torque reduction request by using a value obtained by dividing the turbine torque by the torque amplification ratio of the torque converter TC.

That is, the controller CLR may calculate the turbine torque as described above for an engine torque reduction (ETR) request which is necessary during a shift, and may perform the ETR request on the basis thereof.

For example, the relation equation for calculating the turbine torque may be expressed as follows:

$$T_T(\Delta\dot\omega_T + 0.014 T_{RD} + 130.23 T_{37R})$$

Meanwhile, after performing a shift by controlling the control target shift element, the controller CLR performs a step (S60) of learning the different between the control target and the actual shift state, and performs a step (S70) of correcting the control hydraulic pressure according to what has been learned in the learning step, between the step (S40) of calculating a control hydraulic pressure for implementing the necessary torque of the control target shift element, and the step (S50) of controlling the control target shift element by using the calculated control hydraulic pressure.

That is, when a shift is performed by controlling the transmission TM with the control hydraulic pressure determined through the control matrix H relation equation as described above, the difference the control target and the actual shift state, which tends to occur due to individual processing errors, assembly errors, and the like of the transmission TM, is learned, and the control hydraulic pressure is corrected on the basis thereof, thereby stably implementing the model-based shift control according to the present disclosure.

For reference, in addition to correcting the control hydraulic pressure as described above, as illustrated in FIG. 3, it may also be possible to additionally apply a special correction or the like, such as a correction according to the acceleration pedal manipulation state with reference to acceleration position sensor (APS) outputs.

According to the present disclosure, if above-described control matrices H pre-calculated appropriately for the transmission TM mounted in the vehicle are input to the controller CLR, the external torque or angular acceleration of powertrain components can be instantly calculated as needed, according to the vehicle's traveling situation, and used for control, and this may be automatically corrected through learning. Therefore, rapid mapping of control data is possible without requiring an excessive performance of the controller CLR, and reliability of the control data can be secured, ultimately improving the commercial value by improving the vehicle's shifting quality.

In connection with performing the above-described powertrain shift control, there may be a case in which the controller CLR needs to control the same to perform a shift in a situation in which the flow rate of oil for operating the transmission TM is insufficient.

Such a situation in which the flow rate of oil for operating the transmission TM is insufficient may occur if the number of rotations of the oil pump for supplying oil to the transmission is low, for example, in a low-torque area in which the driver presses down the acceleration pedal by a small amount.

If a shift is performed in such a situation in which the flow rate of oil for operating the transmission is insufficient, a difference occurs between the hydraulic pressure instructed by the controller CLR and the hydraulic pressure actually applied to the transmission, and the shift may not proceed correctly, thereby causing a shift shock. In many cases, the hardware constituting the transmission fail to operate accurately as controlled by the controller CLR, thereby delaying the shift excessively.

Therefore, there is a need to provide a scheme for an appropriate measure such that, even if a shift is performed in such a situation in which the flow rate of oil for operating the transmission is insufficient, the controller CLR can perform appropriate shift control, if possible, thereby accomplishing efficient and stable shift control.

In accordance with an aspect of the present disclosure, a vehicle powertrain shift control method includes a step (S40) of calculating, by a controller CLR configured to divide a shift process into a series of shift phases and perform shift control based on the shift phases, a control hydraulic pressure basic calculated value V1 for implementing a necessary torque of a control target shift element according to the shift phases by using a control matrix H generated from a vehicle powertrain model, a step (S70) of calculating a control hydraulic pressure corrected calculated value V2 by correcting the control hydraulic pressure basic calculated value V1 with a correction value including a learning value regarding the shift element, and a step (S50) controlling the control target shift element according to the control hydraulic pressure corrected calculated value V2.

After the step (S70) of calculating the control hydraulic pressure corrected calculated value and before the step (S50) of controlling the control target shift element, the vehicle powertrain shift control method further includes a step (S80) of determining which of four types of divided hydraulic pressure difference areas a main hydraulic pressure difference belongs, by the controller CLR, the main hydraulic pressure difference being a value obtained by subtracting a coupling-side preparatory hydraulic pressure P2 from a coupling-side preliminary target pressure P3, and a step (S81) of limiting the inclination of the control hydraulic pressure corrected calculated value V2 of a first shift initiation phase SP3 or a second shift initiation phase SP4 so as not to deviate from predetermined limit values, by the controller CLR, when corresponding to an area in which the main hydraulic pressure difference is equal to/less than a predetermined positive first reference value, and an area in which the main hydraulic pressure difference is equal to/larger than a predetermined negative second reference value, respectively, among the four types of hydraulic pressure difference areas.

Figure 11:
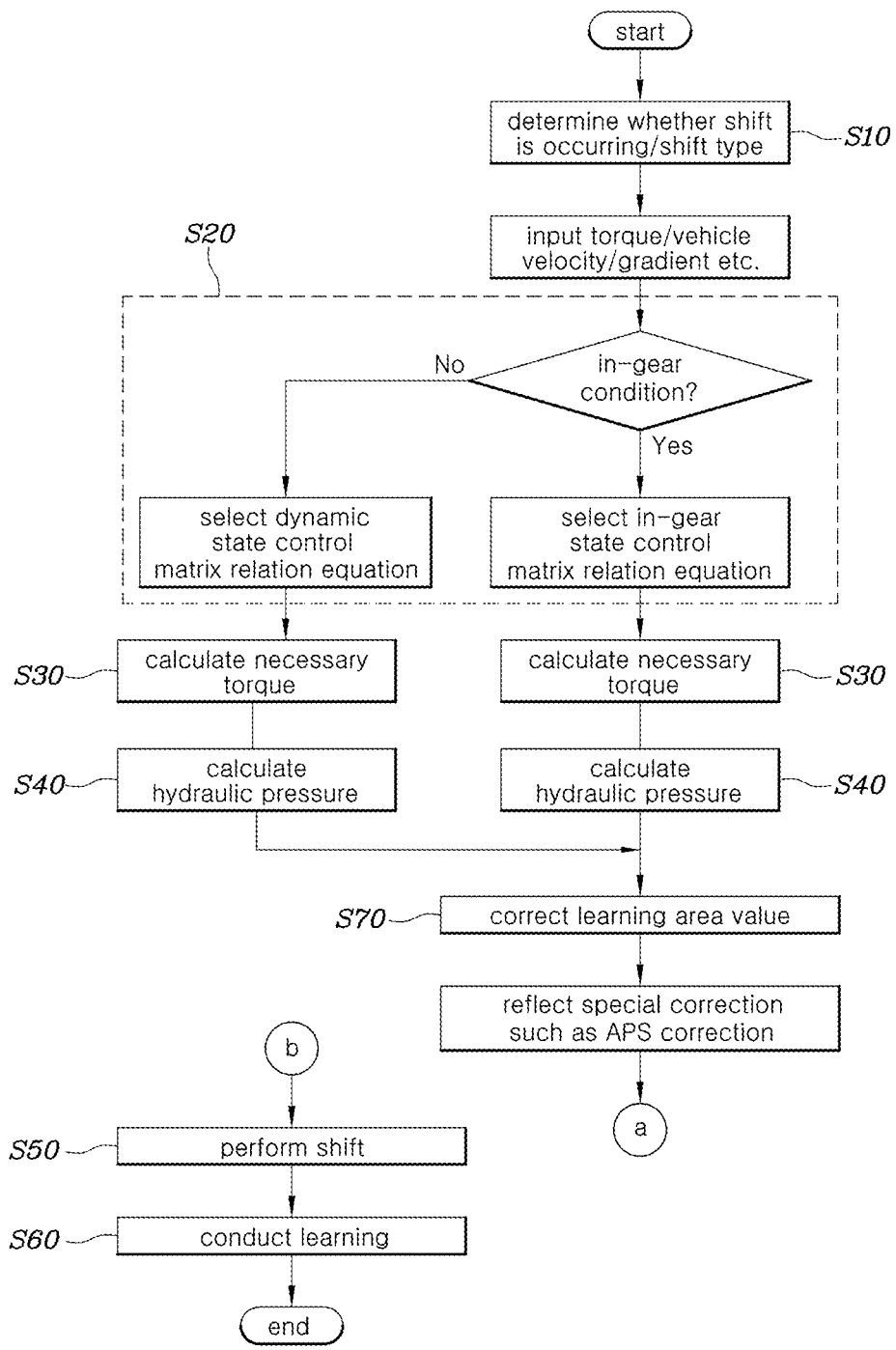
FIG. 11 is a flowchart illustrating an embodiment of a vehicle powertrain switch control method according to the present disclosure.
Figure 12:
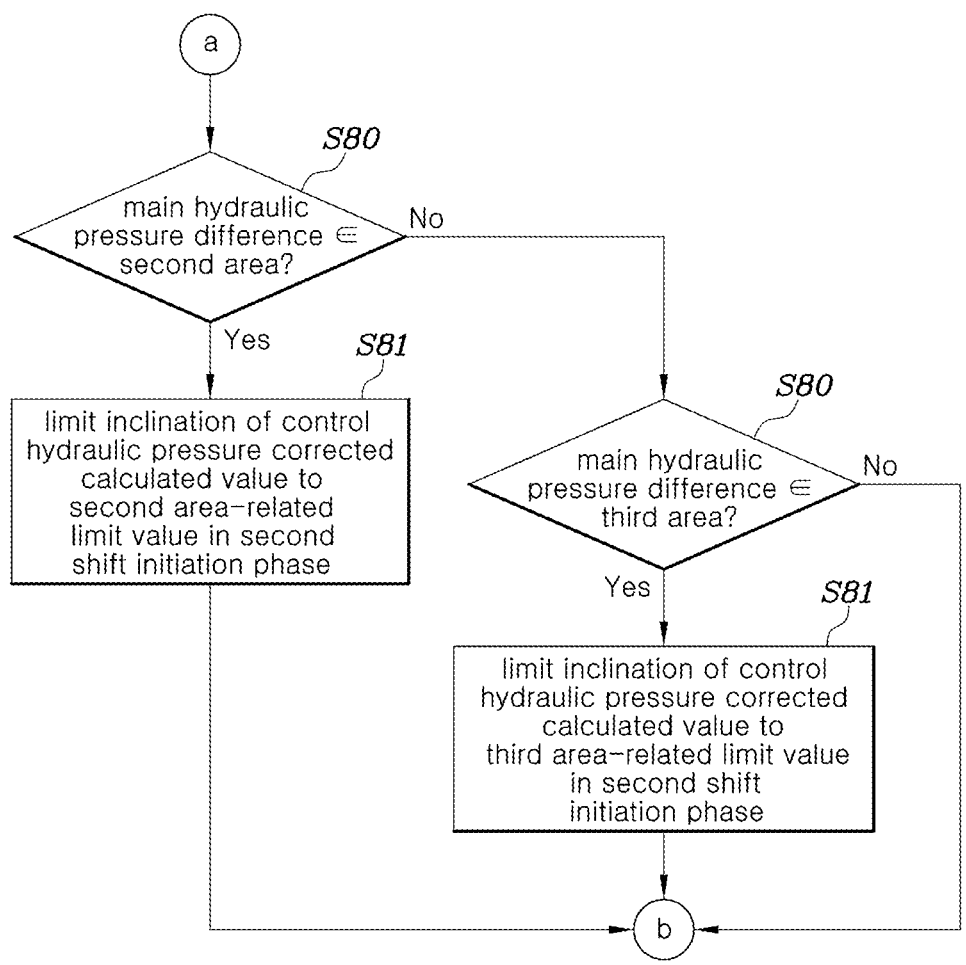
FIG. 12 illustrates a subroutine of FIG. 11 in detail.

FIG. 11 and FIG. 12 are flowcharts expressing the above-described content of the present disclosure, and are basically identical to FIG. 3, except that a subroutine marked by a and b is added to FIG. 11, and is illustrated in detail in FIG. 12.

That is, it may be considered that the present disclosure adds, to the control method illustrated in FIG. 3, limiting the inclination of the control hydraulic pressure corrected calculated value in a specific situation, as illustrated in FIG. 12.

For reference, the main hydraulic pressure difference may be defined as a value obtained by subtracting the coupling-side preparatory hydraulic pressure P2 from the coupling-side preliminary target pressure P3, and the sub-hydraulic pressure different may be defined as a value obtained by subtracting the coupling-side preliminary target pressure P3 from the coupling-side basic target pressure P4.

That is, in order to complete a shift, the coupling-side shift element needs to change from the coupling-side preparatory hydraulic pressure P2 to the coupling-side basic target pressure P4 in the end. The hydraulic pressure difference from the coupling-side preparatory hydraulic pressure P2 to the coupling-side preliminary target pressure P3 is, in general, larger than the hydraulic pressure difference from the coupling-side preliminary target pressure P3 to the coupling-side basic target pressure P4. Therefore, the hydraulic pressure difference from the coupling-side preparatory hydraulic pressure P2 to the coupling-side preliminary target pressure P3 is defined as the main hydraulic pressure difference, and the hydraulic pressure difference from the coupling-side preliminary target pressure P3 to the coupling-side basic target pressure P4 is defined as the sub-hydraulic pressure difference.

A process of controlling a coupling-side shift element during a shift will be described with reference to FIG. 13 and FIG. 14 in order to help understanding of following descriptions.

Figure 13:
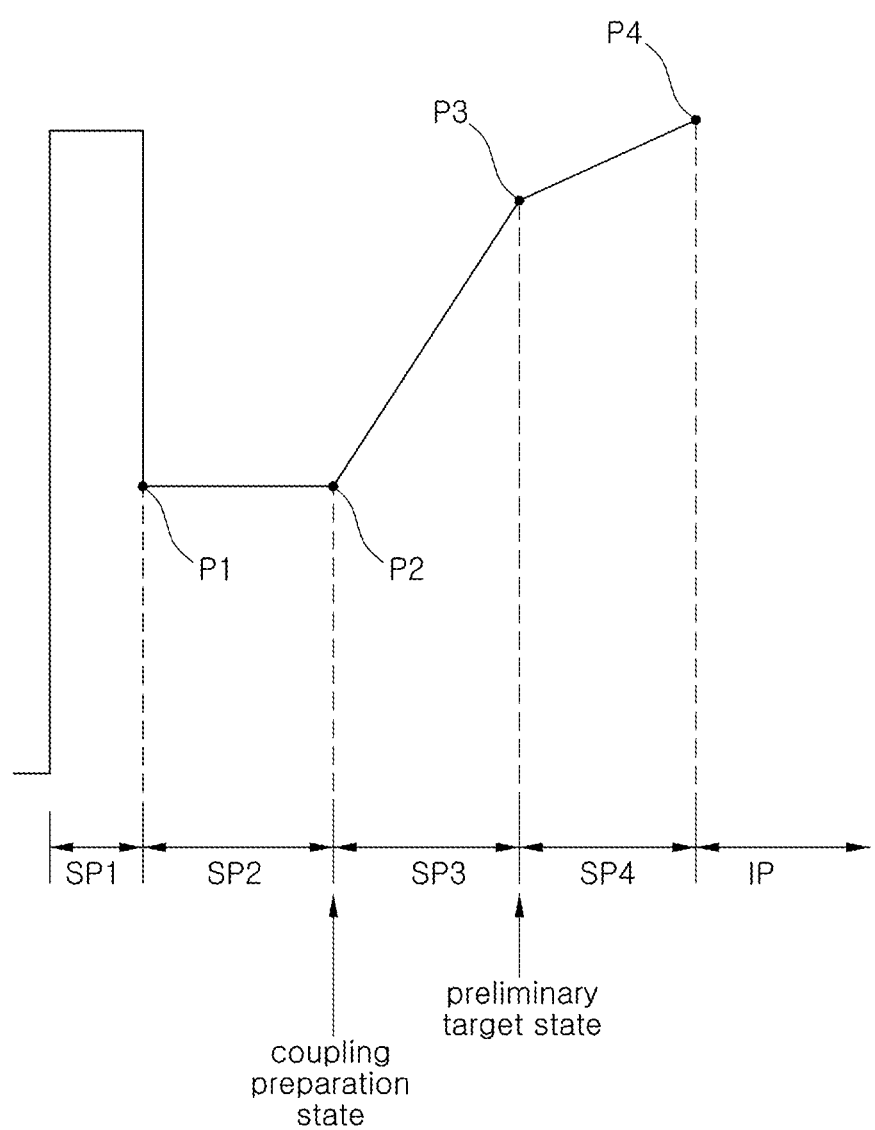
FIG. 13 illustrates a typical example of control hydraulic pressure applied to a coupling-side shift element, such as a clutch or a brake, during a shift.

FIG. 13 illustrates a typical example of control hydraulic pressure applied to a coupling-side shift element, such as a clutch or a brake, during a shift. If a shift is initiated, a fill-time phase SP1 is performed such that the coupling-side shift element is quickly filled with a hydraulic pressure. A hydraulic pressure preparation phase SP2 is then performed. The coupling-side basic target pressure P4 is reached through a first shift initiation phase SP3 and a second shift initiation phase SP4. An inertia phase IP is then performed such that the target shift stage velocity is approached while reducing the turbine's angular velocity.

For reference, the inertia phase IP may be subdivided into multiple shift phases, which will not be described in detail herein.

P1 refers to a control hydraulic pressure at which the fill-time phase SP1 is ended, and at which the hydraulic pressure preparation phase SP2 is started, and substantially corresponds to the coupling-side basic preparatory hydraulic pressure P1 of the coupling-side shift element necessary to prevent the shifting sag phenomenon immediately before initiating the shift.

P2 refers to a control hydraulic pressure at which the hydraulic pressure preparation phase SP2 is ended, and at which the first shift initiation phase SP3 is started. P2 may be identical to P1, or may be a value increased from P1 gradually and constantly over time in consideration of the coupling-side shift element's hardware deviation or instability, and is referred to as a coupling-side preparatory hydraulic pressure P2.

P4 refers to the coupling-side basic target pressure P4 calculated as the coupling-side shift element hydraulic pressure when the turbine angular acceleration becomes zero. P3 refers to the hydraulic pressure of the coupling-side shift element in a preliminary target state. The coupling-side basic target pressure P4, if multiplied by a predetermined buffer coefficient and thus reduced, becomes the coupling-side preliminary target pressure P3.

The coupling-side basic target pressure P4 may be regarded as the hydraulic pressure of the coupling-side shift element for making the turbine angular acceleration zero. Zero turbine angular acceleration means that the turbine angular velocity increases as a shift proceeds, reaches the maximum value, and then starts to decrease. Therefore, coupling-side basic target pressure P4 may be regarded as the control hydraulic pressure of the coupling-side shift element determined such that, as the coupling-side clutch is engaged, the turbine angular velocity stops ascending and starts descending.

In addition, the coupling-side preliminary target pressure P3 is set to be slightly lower than the coupling-side basic target pressure P4 in case a shift shock or the like occurs if the coupling-side shift element is directly raised to the coupling-side basic target pressure P4. Accordingly, the controller CLR first raises the control hydraulic pressure of the coupling-side shift element to the coupling-side preliminary target pressure P3 at a relatively high inclination (corresponding to the first shift initiation phase SP3), and then increases the same to the coupling-side basic target pressure P4 at a relatively low inclination (corresponding to the second shift initiation phase SP4), thereby preventing shift shocks and ensuring a smooth and efficient shift.

Therefore, the buffer coefficient may have a value less than 1. If the buffer coefficient is set to be 0.95, for example, the coupling-side preliminary target pressure P3 is set to have a value corresponding to 95% of the coupling-side basic target pressure P4.

For reference, the shift process illustrated in FIG. 13 may be regarded as including a series of shift phases including a fill-time phase SP1, a hydraulic pressure preparation phase SP2, a first shift initiation phase SP3, a second shift initiation phase SP4, and an inertia phase SP5.

In addition, the first shift initiation phase SP3 may be regarded as a shift phase in which the coupling-side shift element is changed from the coupling preparation state to the preliminary target state.

Figure 14:
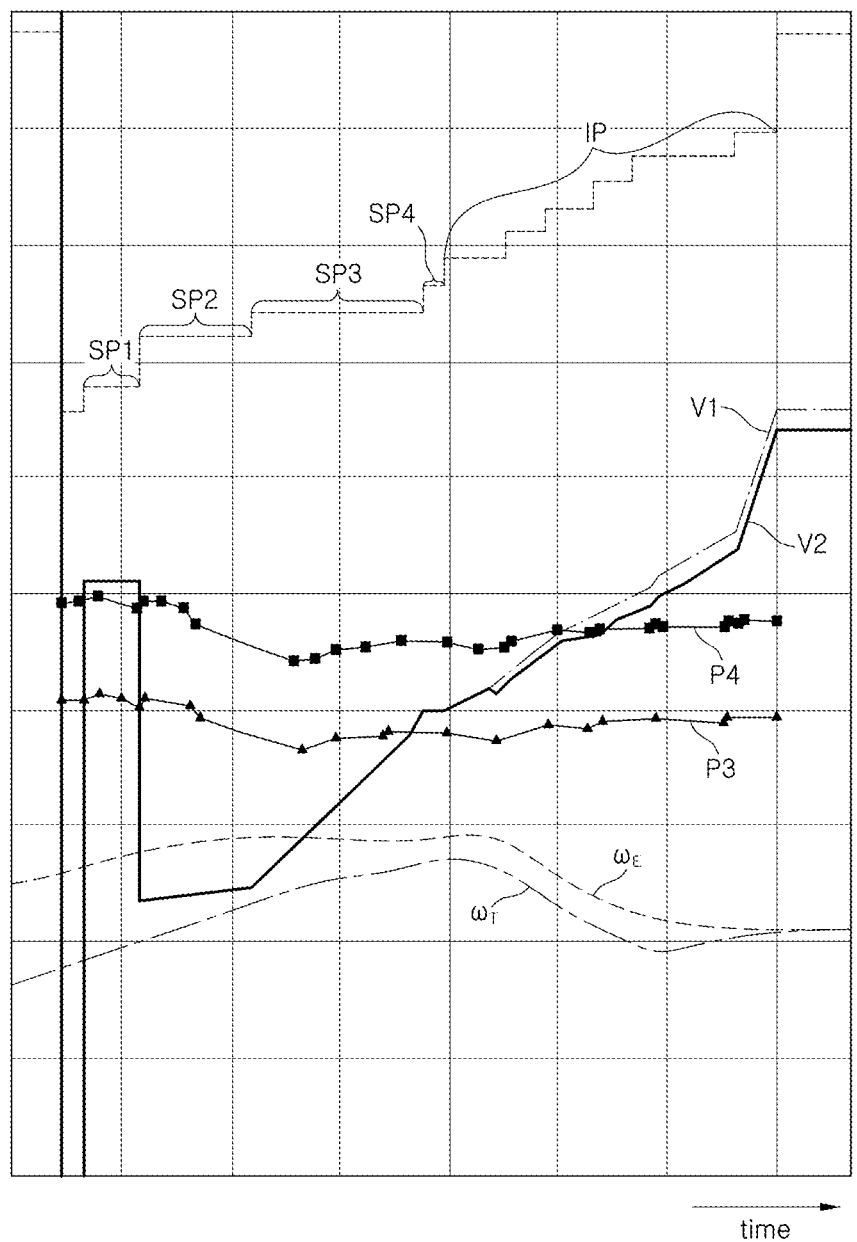
FIG. 14 illustrates a general shift process over time.

FIG. 14 illustrates a shift process over time. Particularly, FIG. 14 illustrates a series of shift phase changes over time, a changed in control hydraulic pressure basic calculated value V1, a changed in control hydraulic pressure corrected calculated value V2, a change in coupling-side basic target pressure P4, a change in coupling-side preliminary target pressure P3, a change in engine angular velocity $\omega_E$, and a change in turbine angular velocity ar.

The controller CLR calculates the control hydraulic pressure basic calculated value V1 on the basis of the shift phases, the coupling-side basic target pressure P4, the coupling-side preliminary target pressure P3, a control matrix H, and various pieces of data of the vehicle.

That is, the controller CLR may obtain a map in advance regarding in what manner the coupling-side shift element is to be controlled for what period of time for the sake of a specific shift, and may input various pieces of data described above to the map, thereby calculating the control hydraulic pressure basic calculated value V1 in real time.

The control hydraulic pressure corrected calculated value V2 is obtained by correcting the control hydraulic pressure basic calculated value V1 by a correction value including a learning value regarding the shift element.

The learning value regarding the shift element may be calculated on the basis of data learned when the previous shift was performed.

In addition, the correction value may include not only the learning value regarding the shift element, but also a value based on special correction, such as correction based on the acceleration pedal manipulation state, with reference to an acceleration position sensor (APS) output as illustrated in FIG. 3.

Consequently, the controller CLR controls the shift element necessary for shifting by using the control hydraulic pressure corrected calculated value V2.

The coupling-side basic target pressure P4 is, as described above, continuously calculated in real time by using the control matrix H according to the current shift situation, and the coupling-side preliminary target pressure P3 is continuously calculated by multiplying the coupling-side basic target pressure P4 by the buffer coefficient.

Figure 15:
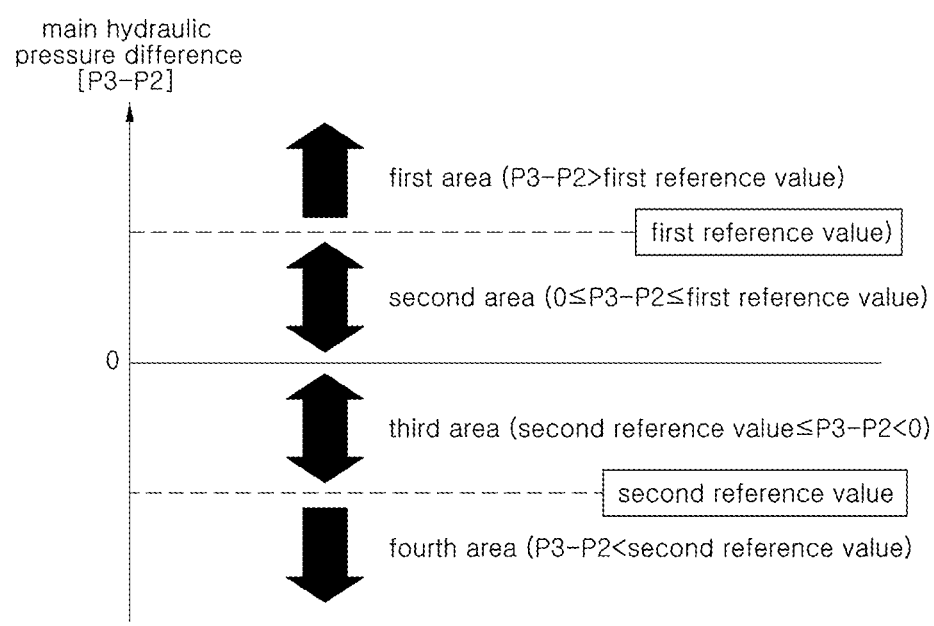
FIG. 15 illustrates fourth hydraulic pressure areas distinguished according to a main hydraulic pressure difference in the present disclosure.

Meanwhile, the four types of hydraulic pressure difference areas may be divided into, as illustrated in FIG. 15, a first area in which the main hydraulic pressure difference is a positive number exceeding the first reference value, a second area in which the main hydraulic pressure difference is equal to/less than the first reference value and is equal to/larger than 0, a third area in which the main hydraulic pressure difference is a negative number equal to/less than the second reference value, and a fourth area in which the main hydraulic pressure difference is less than the second reference value.

The first reference value is a positive number that can be used to determine whether the vehicle is being driven in a low-torque area in which an insufficient flow rate of oil for operating the transmission may excessively delay a shift or may cause a shift shock.

That is, the main hydraulic pressure difference is obtained by subtracting the coupling-side preparatory hydraulic pressure P2 from the coupling-side preliminary target pressure P3, the coupling-side preliminary target pressure P3 is determined from the coupling-side basic target pressure P4, and the coupling-side basic target pressure P4 is determined so as to reflect the vehicle's traveling situation during a shift. Therefore, if the difference between the coupling-side preliminary target pressure P3 and the coupling-side preparatory hydraulic pressure P2 is a relatively small positive number, the vehicle is highly likely to be traveling at a low torque. In such a case, the operating oil is supplied to the transmission at a low flow rate, and is highly like to cause the above-mentioned shift shock or shift delay.

Therefore, the first reference value may be designed and determined on the basis of multiple experiments and analysis for the above-described purpose, and may be 0.35 bar, for example.

The second reference value is a negative number that can be used to assess whether the vehicle is being driven in a low-torque area in which an insufficient flow rate of oil for operating the transmission may excessively delay a shift or may cause a shift shock.

A negative main hydraulic pressure difference means that the coupling-side preliminary target pressure P3 is smaller than the coupling-side preparatory hydraulic pressure P2. Such a case may occur if the vehicle has a manual transmission, or if the vehicle is configured such that the driver can set the coupling-side preparatory hydraulic pressure P2 as desired.

Therefore, the second reference value may also be designed and determined based on multiple experiments and analysis for the above-described purpose, and may be −0.1 bar, for example.

The controller CLR obtains the inclination of the control hydraulic pressure basic calculated value V1 in the first shift initiation phase SP3 and calculates the control hydraulic pressure basic calculated value V1 so as to change along the inclination while performing the first shift initiation phase SP3. The inclination of the control hydraulic pressure basic calculated value V1 is calculated by dividing the main hydraulic pressure difference by the time taken for the first shift initiation phase SP3.

If the main hydraulic pressure difference does not belong to the second or third area, the controller CLR controls the control target shift element along a control hydraulic pressure corrected calculated value V2 obtained by basically correcting the control hydraulic pressure basic calculated value V1 as described above.

Meanwhile, if the main hydraulic pressure difference belongs to the second area, the controller CLR controls the inclination of the control hydraulic pressure corrected calculated value V2 so as not to deviate below a second area-related limit value, which is one of the limit values, in the second shift initiation phase SP4.

This is for the purpose of ensuring that the inclination of the control hydraulic pressure corrected calculated value V2 at least changes to an inclination equal to/larger than the second area-related limit value in the second shift initiation phase SP4 such that the shift is not excessively delayed even in low-flow-rate and low-torque situations of the transmission.

Therefore, the second area-related limit value may be a positive-valued inclination designed and determined on the basis of multiple experiments and analysis for the above-described purpose such that, even in a situation in which the operating oil is supplied to the transmission at a low flow rate, no shift shock occurs, and no excessive shift delay occurs.

In addition, if the main hydraulic pressure difference belongs to the second area, the control target shift element is controlled in the first shift initiation phase SP3 according to the control hydraulic pressure corrected calculated value V2 calculated on the basis of the control hydraulic pressure basic calculated value V1 obtained by dividing the main hydraulic pressure difference by the time taken for the first shift initiation phase.

That is, if the main hydraulic pressure difference belongs to the second area, the same control is conducted in the first shift initiation phase SP3 as in FIG. 3.

To summarize, if the main hydraulic pressure difference belongs to the second area, a shift element is controlled in the first shift initiation phase SP3 by using the control hydraulic pressure corrected calculated value V2 as it is, without limiting the same, which is obtained by correcting the control hydraulic pressure basic calculated value V1, identically to the case in FIG. 3. In the second shift initiation phase SP4, the control hydraulic pressure corrected calculated value V2 is controlled to have at least the inclination of the second area-related limit value, thereby preventing the second shift initiation phase SP4 from being excessively delayed by a low-flow-rate situation.

Figure 16:
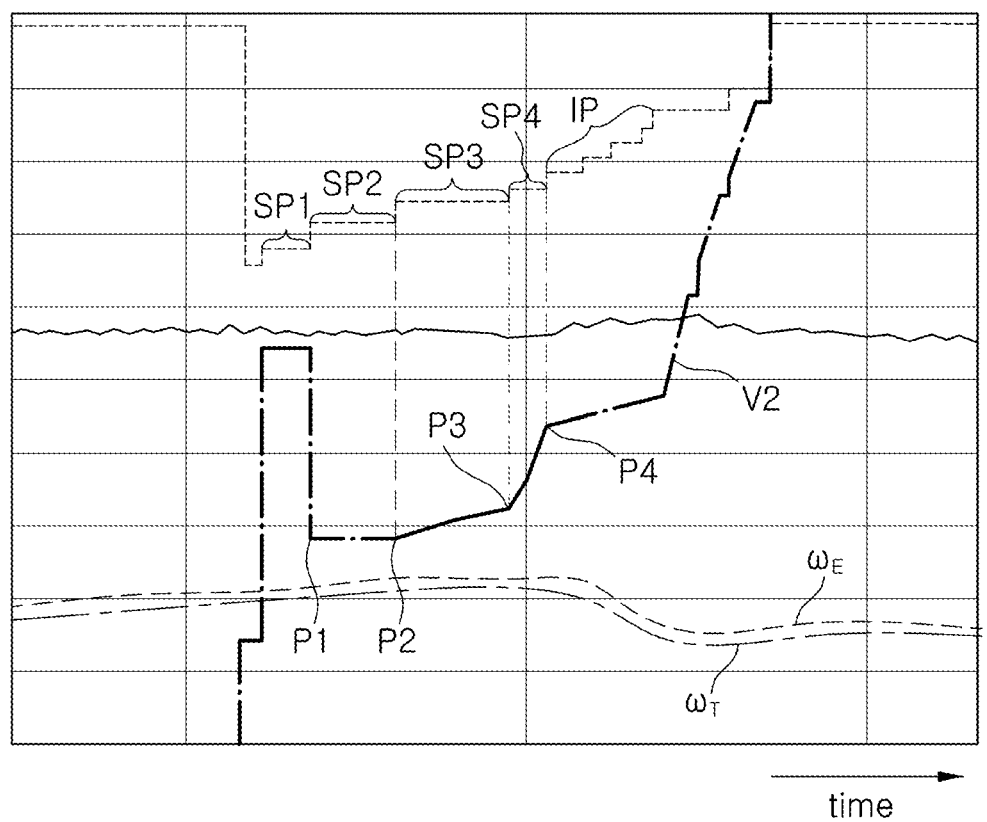
FIG. 16 illustrates a shift process in a case in which the main hydraulic pressure difference belongs to the second area.
Figure 17:
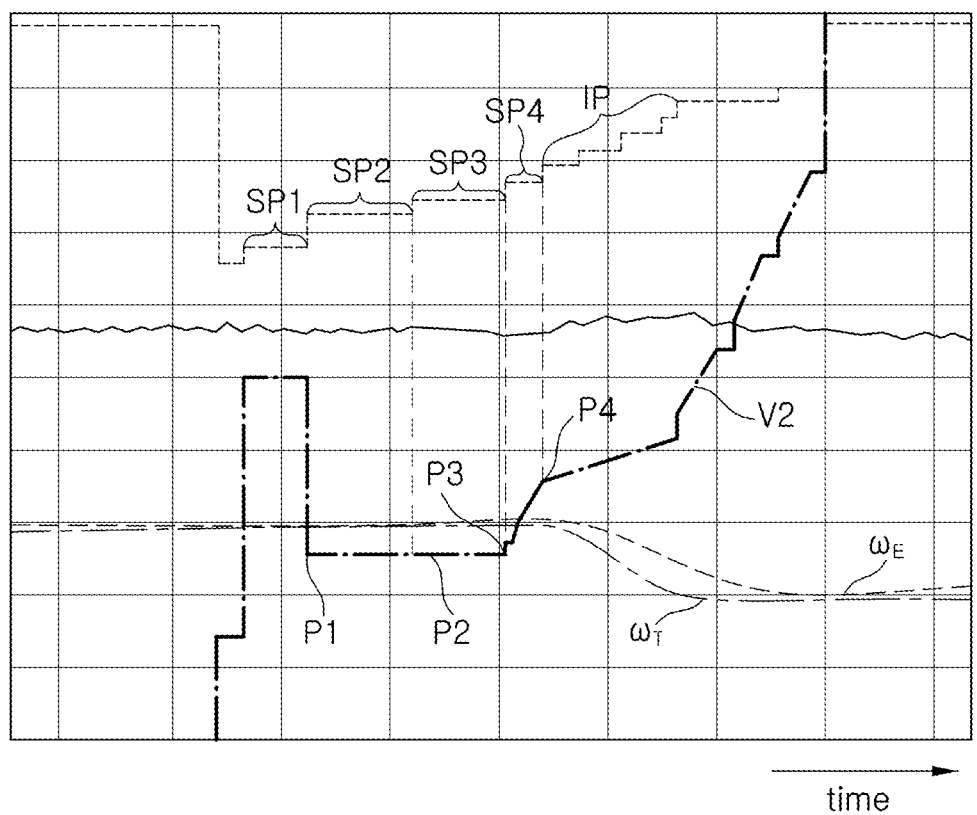
FIG. 17 illustrates a shift process in a case in which the main hydraulic pressure difference belongs to the third area.

FIG. 16 illustrates a shift process to which the present disclosure is applied in a case in which the main hydraulic pressure difference belongs to the second area. In FIG. 16, the control hydraulic pressure corrected calculated value changes by the inclination of the second area-related limit value or more in the second shift initiation phase SP4, and the second shift initiation phase is thus quickly ended, thereby ensuring a quick shift.

If the main hydraulic pressure difference belongs to the third area, the controller CLR controls the inclination of the control hydraulic pressure corrected calculated value V2 so as not to deviate below the third area-related limit, which is one of the limit values, in the second shift initiation phase SP4.

Similarly to the above description, this is for the purpose of ensuring that the inclination of the control hydraulic pressure corrected calculated value V2 at least changes to an inclination equal to/larger than the third area-related limit value in the second shift initiation phase SP4 such that the shift is not excessively delayed even in low-flow-rate and low-torque situations of the transmission.

The third area-related limit value may be a positive-valued inclination designed and determined on the basis of multiple experiments and analysis for the above-described purpose such that, even in a situation in which the operating oil is supplied to the transmission at a low flow rate, no shift shock occurs, and no excessive shift delay occurs.

It may be logically though that, in this case, the inclination of the control hydraulic pressure corrected calculated value V2 needs to have a negative value in the second shift initiation phase SP4 as well. However, the main hydraulic pressure difference is within a very small range in this situation. If inclination of the control hydraulic pressure corrected calculated value V2 has a negative value in a low-flow-rate condition, it is difficult to expect transmission hardware to operate efficiently and appropriately. Therefore, the third area-related limit value is set to be a positive-valued inclination, and the control hydraulic pressure corrected calculated value V2 is made to change at least with a positive-valued inclination equal to/larger than the third area-related limit value in the second shift initiation phase, thereby ensuring that the transmission hardware operates efficiently and quickly finishes the shift.

In addition, if the main hydraulic pressure difference belongs to the third area, the controller CLR limits the inclination of the control hydraulic pressure corrected calculated value V2 to zero, which is one of the limit values, and holds the same in the first shift initiation phase SP3.

That is, if the main hydraulic pressure difference belongs to the third area, the control hydraulic pressure corrected calculated value V2 is maintained with no change while the first shift initiation phase SP3 proceeds. The control hydraulic pressure corrected calculated value V2 is changed to an inclination equal to/larger than the second area-related limit value, which is a positive inclination, while the second shift initiation phase SP4 proceeds, thereby ensuring a quick and smooth shift in low-flow-rate and low-torque situations.

Obviously, if the driver's acceleration pedal tips in (TIP-IN) while the inclination of the control hydraulic pressure corrected calculated value V2 is held at zero in the first shift initiation phase SP3, the controller CLR releases the holding.

After releasing the holding of the control hydraulic pressure corrected calculated value V2 in the first shift initiation phase SP3 as described above, the controller CLR may calculate the control hydraulic pressure basic calculated value V1 by dividing the difference between the coupling-side preliminary target pressure P3 and the current control hydraulic pressure of the control target shift element by the remaining time of the first shift initiation phase, and may control the control target shift element according to the control hydraulic pressure corrected calculated value V2 calculated on the basis of the control hydraulic pressure basic calculated value V1 calculated as described above.

Meanwhile, the controller CLR may perform the step of dividing the main hydraulic pressure difference into four types of hydraulic pressure difference areas in the final stage of the hydraulic pressure preparation phase SP2 or in the initial phase of the first shift initiation phase SP3 such that the change in control hydraulic pressure corrected calculated value V2 in the following first shift initiation phase SP3 and second shift initiation phase SP4 is limited appropriately, thereby ensuring a quick and smooth shift in low-flow-rate and low-torque situations.

Obviously, upon determining that the main hydraulic pressure difference does not belong to the second or third area but belongs to the first or fourth area, the controller CLR skips the subroutine in FIG. 12 and proceeds to the step (S50) of controlling the control target shift element after the step (S70) of calculating the control hydraulic pressure corrected calculated value V2.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A vehicle powertrain shift control method comprising:
   calculating, by a controller configured to divide a shift process into a series of shift phases and perform shift control based on the series of shift phases, a control hydraulic pressure basic calculated value for implementing a necessary torque of a control target shift element according to the series of shift phases by using a control matrix generated from a vehicle powertrain model;
   calculating a control hydraulic pressure corrected calculated value by correcting the control hydraulic pressure basic calculated value with a correction value comprising a learning value regarding the shift element; and
   controlling the control target shift element according to the control hydraulic pressure corrected calculated value;
   wherein, after calculating the control hydraulic pressure corrected calculated value, and before controlling the control target shift element, the vehicle powertrain shift control method further comprises:
   determining to which of four types of divided hydraulic pressure difference areas a main hydraulic pressure difference belongs, by the controller, the main hydraulic pressure difference being a value obtained by subtracting a coupling-side preparatory hydraulic pressure from a coupling-side preliminary target pressure; and
   limiting an inclination of the control hydraulic pressure corrected calculated value of a first shift initiation phase or a second shift initiation phase so as not to deviate from predetermined limit values, by the controller, when corresponding to an area in which the main hydraulic pressure difference is equal to or less than a predetermined positive first reference value, and an area in which the main hydraulic pressure difference is equal to or larger than a predetermined negative second reference value, respectively, among the four types of hydraulic pressure difference areas.

2. The vehicle powertrain shift control method of claim 1, wherein the four types of hydraulic pressure difference areas are divided into:
   a first area in which the main hydraulic pressure difference is a positive number exceeding the first reference value;
   a second area in which the main hydraulic pressure difference is equal to or less than the first reference value and is equal to or larger than zero;
   a third area in which the main hydraulic pressure difference is a negative number equal to/larger than the second reference value; and
   a fourth area in which the main hydraulic pressure difference is less than the second reference value.

3. The vehicle powertrain shift control method of claim 2, wherein, in the first shift initiation phase, the inclination of the control hydraulic pressure basic calculated value is calculated by dividing the main hydraulic pressure difference by a time taken for the first shift initiation phase.

4. The vehicle powertrain shift control method of claim 3, wherein, in a case in which the main hydraulic pressure difference belongs to the second area, the controller controls the inclination of the control hydraulic pressure corrected calculated value so as not to deviate below a second area-related limit value, which is one of the limit values, in the second shift initiation phase.

5. The vehicle powertrain shift control method of claim 4, wherein, in a case in which the main hydraulic pressure difference belongs to the second area, the control target shift element is controlled in the first shift initiation phase according to the control hydraulic pressure corrected calculated value calculated on the basis of the control hydraulic pressure basic calculated value calculated by dividing the main hydraulic pressure difference by the time taken for the first shift initiation phase.

6. The vehicle powertrain shift control method of claim 3, wherein, in a case in which the main hydraulic pressure difference belongs to the third area, the controller controls the inclination of the control hydraulic pressure corrected calculated value so as not to deviate below a third area-related limit value, which is one of the limit values, in the second shift initiation phase.

7. The vehicle powertrain shift control method of claim 6, wherein, in a case in which the main hydraulic pressure difference belongs to the third area, the controller performs holding by limiting the inclination of the control hydraulic pressure corrected calculated value to zero, which is one of the limit values, and maintaining the zero value in the first shift initiation phase.

8. The vehicle powertrain shift control method of claim 7, wherein the holding is released if a driver tip-in occurs while holding the inclination of the control hydraulic pressure corrected calculated value to zero in the first shift initiation phase.

9. The vehicle powertrain shift control method of claim 8, wherein, if holding of the control hydraulic pressure corrected calculated value is released in the first shift initiation phase, the control hydraulic pressure corrected calculated value is calculated by dividing the difference between the coupling-side preliminary target pressure and the control hydraulic pressure of the control target shift element by the remaining time of the first shift initiation phase, the control target shift element is controlled according to the control hydraulic pressure corrected calculated value calculated based on the control hydraulic pressure basic calculated value calculated.

10. The vehicle powertrain shift control method of claim 1, wherein the controller performs dividing of the main hydraulic pressure difference into four types of hydraulic pressure difference areas in the final stage of a hydraulic pressure preparation phase or in the initial phase of the first shift initiation phase.

11. The vehicle powertrain shift control method of claim 1, wherein the control matrix is calculated by using relation equations of angular velocity, angular acceleration, moment of inertia, and torque of powertrain components, and a boundary condition based on a transmission state, and the controller performs calculating of the control hydraulic pressure basic calculated value by selecting a predetermined control matrix according to whether a shift is proceeding and the type of the shift.

12. The vehicle powertrain shift control method of claim 11, wherein the control matrix is calculated by multiplying an inverse matrix of an angular acceleration dominant matrix comprising coefficients of angular acceleration terms of the relation equations by an external torque dominant matrix comprising coefficients of external torque terms of the relation equations, and the external torques are torques which can be controlled by the controller, or which are input to the powertrain from an outside.

13. The vehicle powertrain shift control method of claim 12, wherein the control matrix comprises:
in-gear state control matrices regarding an in-gear state in which the transmission is not conducting a shift; and
a dynamic state control matrix regarding an ongoing shift state.

14. The vehicle powertrain shift control method of claim 13, wherein one in-gear state control matrix is provided with regard to each shift stage which the transmission can implement, and
one dynamic state control matrix is provided with regard to each shift element which remains engaged during a shift.

15. The vehicle powertrain shift control method of claim 14, wherein the controller selects a control matrix regarding a shift element which remains engaged before or after a shift from the dynamic state control matrix if the transmission is shifting.

16. The vehicle powertrain shift control method of claim 15, wherein the angular acceleration dominant matrix is configured by:
separating angular acceleration terms of the relation equations into a product of an angular acceleration coefficient matrix and an angular acceleration column vector, placing the product on one side of the equal sign, separating external torque terms of the relation equations into a product of an external torque coefficient matrix and an external torque column vector, and placing the product on an other side of the equal sign;
multiplying columns of coefficients regarding external torque terms in a completely connected state, among the powertrain components, and considered as linear parameters changed by a torque input to the powertrain, among the external torque coefficient matrix, by −1, and connecting and placing a resulting rigid connection matrix to a right of the angular acceleration coefficient matrix;
connecting and placing a boundary condition matrix comprising rows expressing a boundary condition according to the state of the transmission beneath the angular acceleration coefficient matrix; and
placing a dummy matrix filled with zero at an intersection between the rigid connection matrix and the boundary condition matrix of the angular acceleration coefficient matrix, thereby configuring a square matrix.

17. The vehicle powertrain shift control method of claim 16, wherein the external torque dominant matrix comprises a dummy matrix obtained by filling columns used for the rigid connection matrix, among the external torque coefficient matrix, with zero, and filling rows corresponding to the boundary condition matrix of the angular acceleration coefficient matrix with zero.

* * * * *